(12) United States Patent
Ottney

(10) Patent No.: US 7,864,432 B2
(45) Date of Patent: Jan. 4, 2011

(54) FUSION NIGHT VISION SYSTEM

(75) Inventor: Joseph C. Ottney, Londonderry, NH (US)

(73) Assignee: L-3 Insight Technology Incorporated, Londonderry, NH (US)

( * ) Notice: Subject to any disclaimer, the term of this patent is extended or adjusted under 35 U.S.C. 154(b) by 378 days.

(21) Appl. No.: 11/928,328

(22) Filed: Oct. 30, 2007

(65) Prior Publication Data

US 2009/0051760 A1 Feb. 26, 2009

Related U.S. Application Data

(63) Continuation of application No. 11/173,234, filed on Jul. 1, 2005, now Pat. No. 7,307,793.

(51) Int. Cl.
*G02B 27/14* (2006.01)
(52) U.S. Cl. ............... 359/634; 359/629; 359/353; 348/216.1; 348/217.1; 348/218.1; 348/223.1
(58) Field of Classification Search ............... 359/630, 359/634, 629; 348/216.1, 217.1, 218.1, 223.1
See application file for complete search history.

(56) References Cited

U.S. PATENT DOCUMENTS 4,720,871 A * 1/1988 Chambers ............... 382/278
6,560,029 B1 * 5/2003 Dobbie et al. ............... 359/631
7,345,277 B2 * 3/2008 Zhang ........................ 250/330

\* cited by examiner

*Primary Examiner*—Joseph Martinez

(57) ABSTRACT

A fusion night vision system having image intensification and thermal imaging capabilities includes an edge detection filter circuit to aid in acquiring and identifying targets. An outline of the thermal image is generated and combined with the image intensification image without obscuration of the image intensification image. The fusion night vision system may also include a parallax compensation circuit to overcome parallax problems as a result of the image intensification channel being spaced from the thermal channel. The fusion night vision system may also include a control circuit configured to maintain a perceived brightness through an eyepiece over a mix of image intensification information and thermal information. The fusion night vision system may incorporate a targeting mode that allows an operator to acquire a target without having the scene saturated by a laser pointer. The night vision system may also include a detector, an image combiner for forming a fused image from the detector and a display, and a camera aligned with image combiner for recording scene information processed by the first detector.

12 Claims, 25 Drawing Sheets

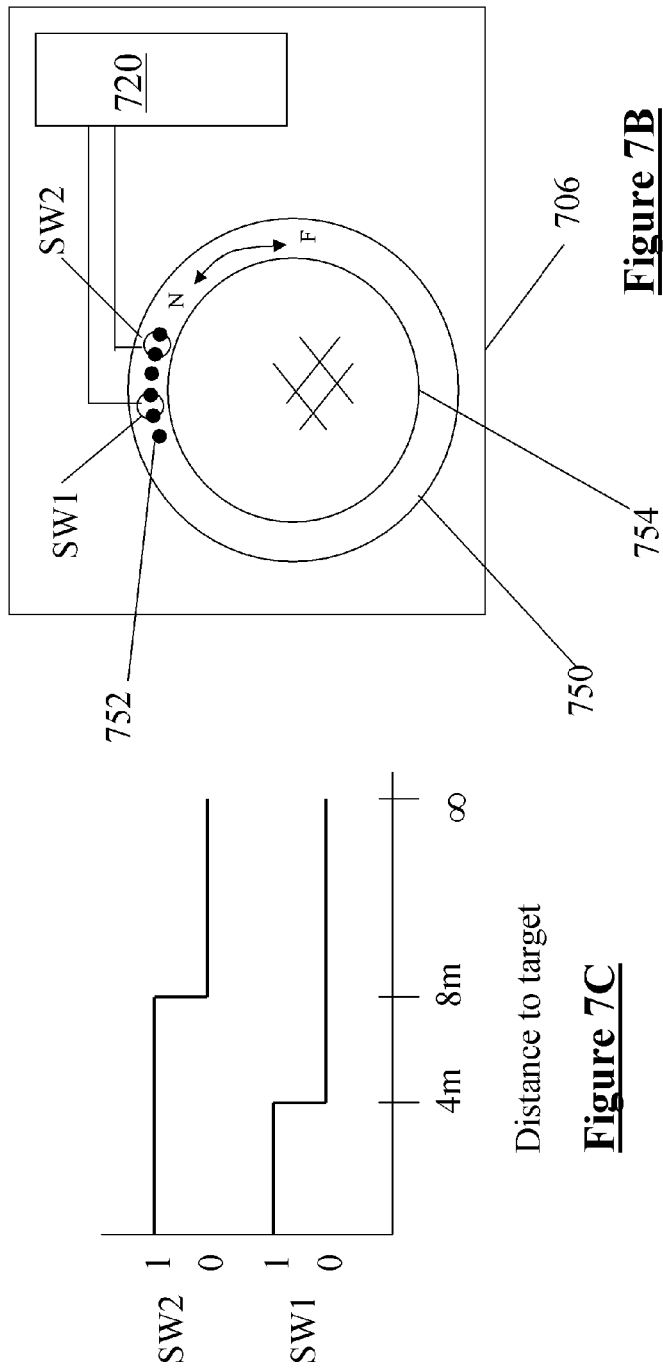

| Distance to target | SW1 | SW2 | Image Shift |
|---|---|---|---|
| 0-4 m | 0 | 0 | 10 pixels |
| 4-8m | 1 | 0 | 7 pixels |
| 8-15 | 1 | 1 | 3 pixels |
| 15- infinity | 0 | 1 | 0 pixel |

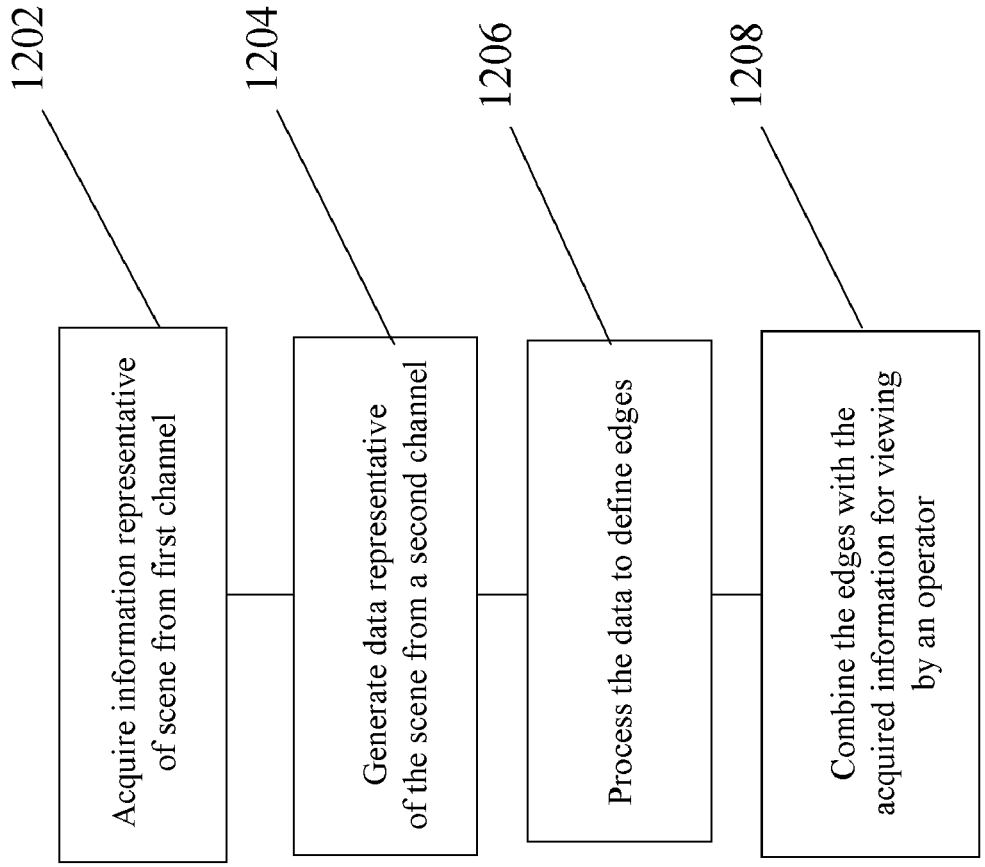

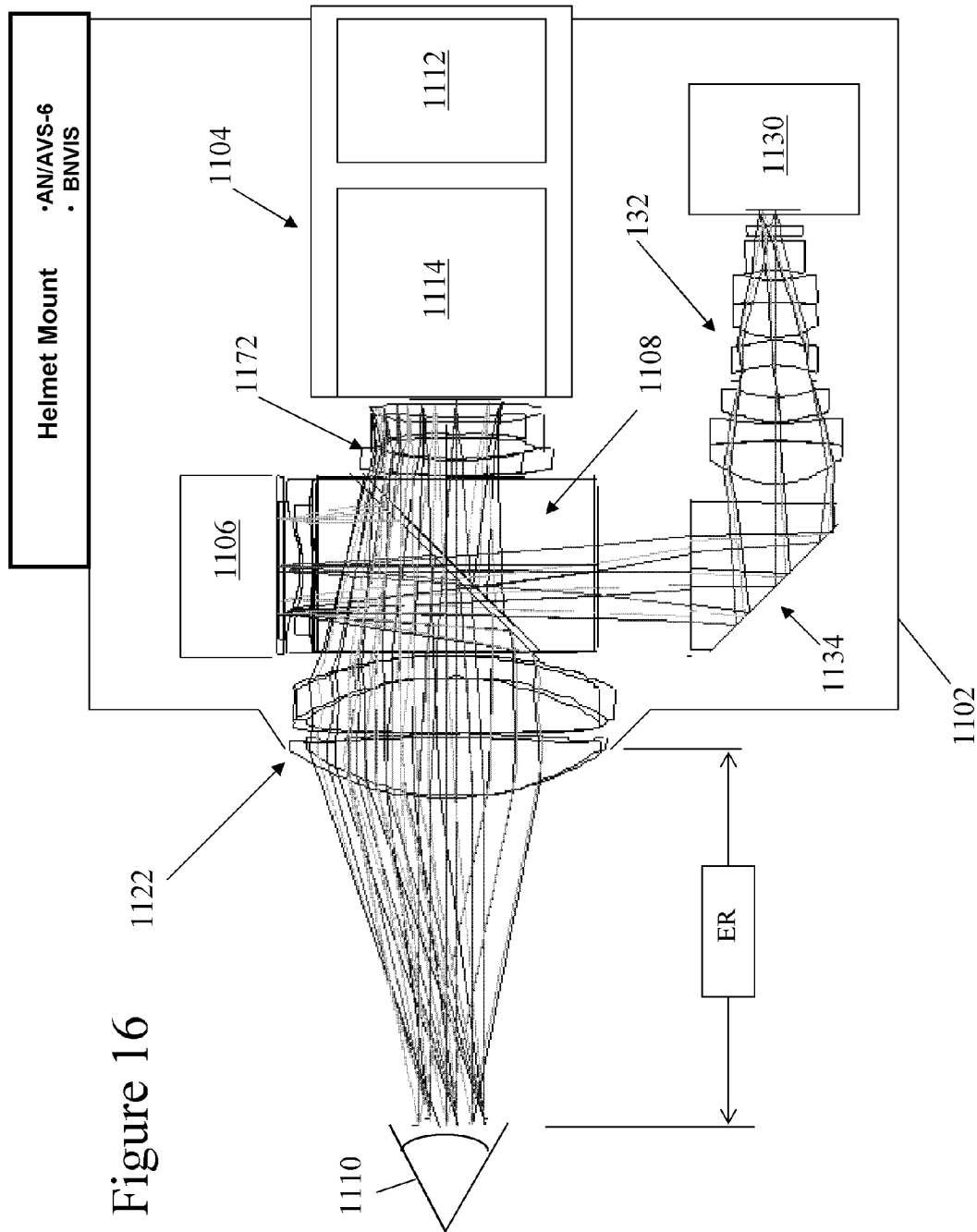

FUSION NIGHT VISION SYSTEM

CROSS REFERENCE TO RELATED APPLICATIONS

The present application is a continuing application and claims the benefit under 35 U.S.C. 120 to U.S. patent application Ser. No. 11/173,234, filed Jul. 1, 2005 now U.S. Pat. No. 7,307,793, the entire disclosure of which is incorporated herein by reference.

TECHNICAL FIELD

The invention is generally related to night vision devices and, more particularly, to systems and methods for improving the viewability and recordability of images through a night vision device.

BACKGROUND OF THE INVENTION

Night vision systems include image intensification, thermal imaging, and fusion monoculars, binoculars, and goggles, whether hand-held, weapon mounted, or helmet mounted. Standard night vision systems are typically equipped with one or more image intensifier tubes to allow an operator to see visible wavelengths of radiation (approximately 400 nm to approximately 900 nm). They work by collecting the tiny amounts of light, including the lower portion of the infrared light spectrum, that are present but may be imperceptible to our eyes, and amplifying it to the point that an operator can easily observe the image. These devices have been used by soldier and law enforcement personnel to see in low light conditions, for example at night or in caves and darkened buildings. These devices take ambient light and magnify the light up to and in excess of 50,000 times and display the image for viewing through an eyepiece. A drawback to night vision goggles is that they cannot see through smoke and heavy sand storms and cannot see a person hidden under camouflage.

Infrared thermal sensors allow an operator to see people and objects because they emit thermal energy. These devices operate by capturing the upper portion of the infrared light spectrum, which is emitted as heat by objects instead of simply reflected as light. Hotter objects, such as warm bodies, emit more of this wavelength than cooler objects like trees or buildings. Since the primary source of infrared radiation is heat or thermal radiation, any object that has a temperature radiates in the infrared. One advantage of infrared sensors is that they are less attenuated by smoke and dust and a drawback is that they typically do not have sufficient resolution and sensitivity to provide acceptable imagery of the scene.

Fusion systems have been developed that combine image intensification with thermal sensing. The image intensification information and the infrared information are fused together to provide a fused image that provides benefits over just image intensification or just thermal sensing. Whereas typical night vision devices with image intensification can only see visible wavelengths of radiation, the fused system provides additional information by providing heat information to the operator.

FIG. 1 is a block diagram of an electronically fused night vision system 100, FIG. 2 is a block diagram of an optically fused night vision system 200, and FIG. 1A is an illustration of the fused night vision systems 100 and 200. The systems electronics and optics are housed in a housing 102, which can be mounted to a military helmet, and are powered by battery pack(s) 104. Information from an image intensification ($I^2$) channel 106 and a thermal channel 108 are fused together for viewing by an operator through one or more eyepieces 110. The eyepieces 110 have one or more ocular lenses for magnifying and/or focusing the fused image. The $I^2$ channel 106 is configured to process information in a first range of wavelengths (the visible portion of the electromagnetic spectrum from 400 nm to 900 nm) and the thermal channel 108 is configured to process information in a second range of wavelengths (7,000 nm-14,000 nm). The $I^2$ channel 106 has an objective focus 112 and an $I^2$ tube 114 and the thermal channel 108 has an objective focus 116 and an infrared focal plane array 118.

As shown in FIG. 1, the $I^2$ information is coupled to charge-coupled device (CCD) and electronics 140 and the thermal information is coupled to signal processing electronics 144. The output from the CCD and electronics 140 and the signal processing electronics 144 are inputted into mixing/display electronics 142. The analog video signal output of the mixing/display electronics 142 is coupled to displays 146 for viewing through eyepieces 110.

As shown in FIG. 2, the $I^2$ information from the $I^2$ channel 106 is directed to the eyepieces 110 using a beam splitter cube 230, a prism 232, and an optical relay 248. The thermal information from the focal plane array 118 is inputted into the signal processing electronics 250 and then outputted to display 246. The output of the display 246 is projected onto the beam splitters cube 230 for viewing through eyepiece 110.

The housing 102 has three knobs mechanically coupled to potentiometers 120, 122, and 124. In the electronically fused system 100, potentiometer 120 controls system on/off and display brightness, potentiometer 122 controls auto/manual gain of the thermal channel, and potentiometer 124 controls the mix of thermal and image intensification information viewable through the eyepieces 110. The on/off brightness potentiometer 120 allows the operator to turn the system on and off and control the brightness of the fused image in the displays 146, auto/manual gain potentiometer 122 allows the operator to select between manual and automatic control of the gain of the thermal channel 108, and the fusion mixing potentiometer 124 coupled to the mixing/display electronics 142 adjusts the proportional summation of the focal plane signal and the CCD signal. When the fusion mixing potentiometer 124 is rotated in one direction, the perceived percentage of $I^2$ information viewable in the eyepieces 110 is decreased and the perceived percentage of thermal information viewable in the eyepieces 110 is increased. When the fusion mixing potentiometer 124 is turned in the opposite direction, the perceived percentage of $I^2$ information viewable in the eyepieces 110 is increased and the perceived percentage of thermal information viewable in the eyepieces 110 is decreased. Using the on/off brightness potentiometer 120, the perceived brightness of the displays 146 can be controlled independently of the mix of $I^2$ and thermal information in the fused image.

In the optically fused system 200, potentiometer 120 controls brightness of the thermal image, potentiometer 122 controls auto/manual gain of the thermal channel and potentiometer 124 controls the $I^2$ channel gain. When potentiometer 120 is increased the perceived percentage of thermal information in the fused image increases and when potentiometer 124 is increased the perceived percentage of $I^2$ information in the fused image increases. A problem with the optically fused system 200 is that two separate potentiometers must be adjusted to control the mix of $I^2$ and thermal information in the fused image and there is no independent control of the perceived brightness of the fused image.

Fusion goggle systems have the optical axis of the thermal channel physically offset a fixed distance from the optical axis of the $I^2$ channel. The optical axes of the thermal channel and the $I^2$ channel are typically factory aligned such that the image from the thermal channel is fused and is aligned in the eyepiece with the image from the $I^2$ channel when the image being viewed is at a predetermined distance, typically aligned at infinity. At distances different from the predetermined distance, parallax can cause a misalignment of the two images in the eyepiece. The parallax problem exists if the thermal channel and the $I^2$ channels are offset in the horizontal as well as the vertical directions.

In fusion night vision systems, light entering a thermal channel is sensed by a two-dimensional array of infrared-detector elements. The detector elements create a very detailed temperature pattern, which is then translated into electric impulses that are communicated to a signal-processing unit. The signal-processing unit then translates the information into data for a display. The display may be aligned with an image combiner for viewing through an ocular lens within an eyepiece. Thermal imagers can sense temperatures ranging from −40 to +50° C. and can detect changes in temperature as small as 0.025° C. The different temperatures are typically displayed as varying shades between black and white. Depending on the location of a target and its surroundings, information from the thermal channel can obscure the information from the image intensification channel and make it more difficult to acquire and identify a target.

Night vision systems may also employ displays that may be viewed through the eyepiece. These displays, often referred to as heads-up displays, may display system information and/or scene information from an infrared sensor. Information from the display may be overlaid on the image intensification scene information and/or the infrared scene information.

Night vision systems have incorporated cameras to record battle scene information. Some night vision systems have the camera located in the optical path between the operator's eye and the vertex of the first optical element (referred to herein as the eye relief). The draw back to this approach is that the camera encroaches on the eye relief. To restore an acceptable eye relief, night vision system must be moved further from the eye of the operator. Night vision systems are intended to be portable with smaller and lighter systems being more desirable. These systems may be mounted to headgear, for example military issue AN/AVS-6 or BNVIS headgear. A heavier system that has a center of gravity far from the soldier's head results in discomfort and neck strain to the user.

Other night vision systems have attempted to digitize the image intensification scene information and combine the image intensification scene information in a display with either the system information and/or the scene information from an infrared sensor/detector. The drawback to these systems is that the resolution of the digitized imagery is reduced typically by a factor of two, which is often insufficient for most military applications.

SUMMARY OF THE INVENTION

According to one aspect of the invention, there is provided a fusion night vision system including a housing, a first channel at least partially disposed within the housing for processing information in a first range of wavelengths, a second channel at least partially disposed within the housing for processing information in a second range of wavelengths, an edge detection filter circuit coupled to the second channel, and an image combiner for combining the information from the first channel with the output of the edge detection filter circuit.

In another aspect of the invention, there is provided a method of displaying information representative of a scene, the method includes: acquiring information representative of the scene from a first channel configured to process information in a first range of wavelengths; generating data representative of the scene from a second channel configured to process information in a second range of wavelengths; processing the data to define edges; and combining the edges with the acquired information for viewing by an operator.

According to another aspect of the invention, there is provided a fusion night vision system including a housing, a first channel for processing information in a first range of wavelengths, a second channel for processing information in a second range of wavelengths, a display coupled to the second channel, and a parallax compensation circuit coupled to the display and configured to receive distance to target information.

According to yet another aspect of the invention, there is provided a fusion night vision system including a housing, an eyepiece, an optical image combiner, a first channel for processing information in a first range of wavelengths, a second channel for processing information in a second range of wavelengths, and a display optically aligned with the optical image combiner. The fusion night vision system further including a control circuit coupled to the first channel, the second channel, and the display. The control circuit configured to receive a first signal representative of a desired mix of information from the first channel and the second channel and a second signal representative of a desired perceived brightness of a fused image as viewed through the eyepiece. The control circuit configured to adjust a brightness of the second channel, a contrast of the second channel, and a brightness of the first channel to achieve the desired mix of information as the first signal changes while generally maintaining the desired perceived brightness of the fused image.

According to one aspect of the invention, there is provided a night vision system including a housing, a detector for processing information in a first range of wavelengths, a display for projecting information to an operator, an image combiner, and a camera for capturing scene information. The image combiner being configured to combine the information from the detector and the display for viewing by an operator and the camera configured to capture scene information that reflects off of the image combiner from the detector.

In another aspect of the invention, there is provided a night vision system including a housing, a detector, a display for projecting information to an operator, an image combiner, and a camera for capturing scene information. The image combiner is configured to combine the information from the detector and the display for viewing by an operator and the camera is optically aligned with the detector through the image combiner.

According to another aspect of the invention, there is provided a night vision system including a housing, a detector for processing information in a first range of wavelengths, a display for projecting information to an operator, an image combiner, and a camera for capturing scene information. The image combiner being configured to combine the information from the detector and the display for viewing by an operator while simultaneously allowing the camera to capture scene information reflected off of the image combiner from the detector.

According to a further aspect of the invention, there is provided a method of viewing and recording a scene, the method includes: processing scene information in an image intensification tube; directing the scene information on to an image combiner; displaying data on a display aligned with the image combiner; and recording the scene information from the image intensification tube and the display through the image combiner.

According to a yet further aspect of the invention, there is provided a method of locating a target with a fusion night vision system having automatic gain control of a thermal channel and an image intensification tube, the method includes receiving an enter targeting mode signal, reducing the gain of an image intensification tube, and leaving the automatic gain of the thermal channel enabled.

BRIEF DESCRIPTION OF THE DRAWINGS

For a better understanding of the invention, together with other objects, features and advantages, reference should be made to the following detailed description which should be read in conjunction with the following figures wherein like numerals represent like parts:

FIG. 7B is a schematic of an autonomous parallax correction circuit consistent with the invention.

FIG. 7C is a first switch state diagram consistent with the invention.

FIG. 7D is a first parallax correction look-up table consistent with the invention.

FIG. 12 is a first flow chart for use in the system of FIGS. 3, 4A, 4C and 5.

FIG. 16 is a ray diagram for the night vision system of FIG. 15.

DETAILED DESCRIPTION

Figure 1:
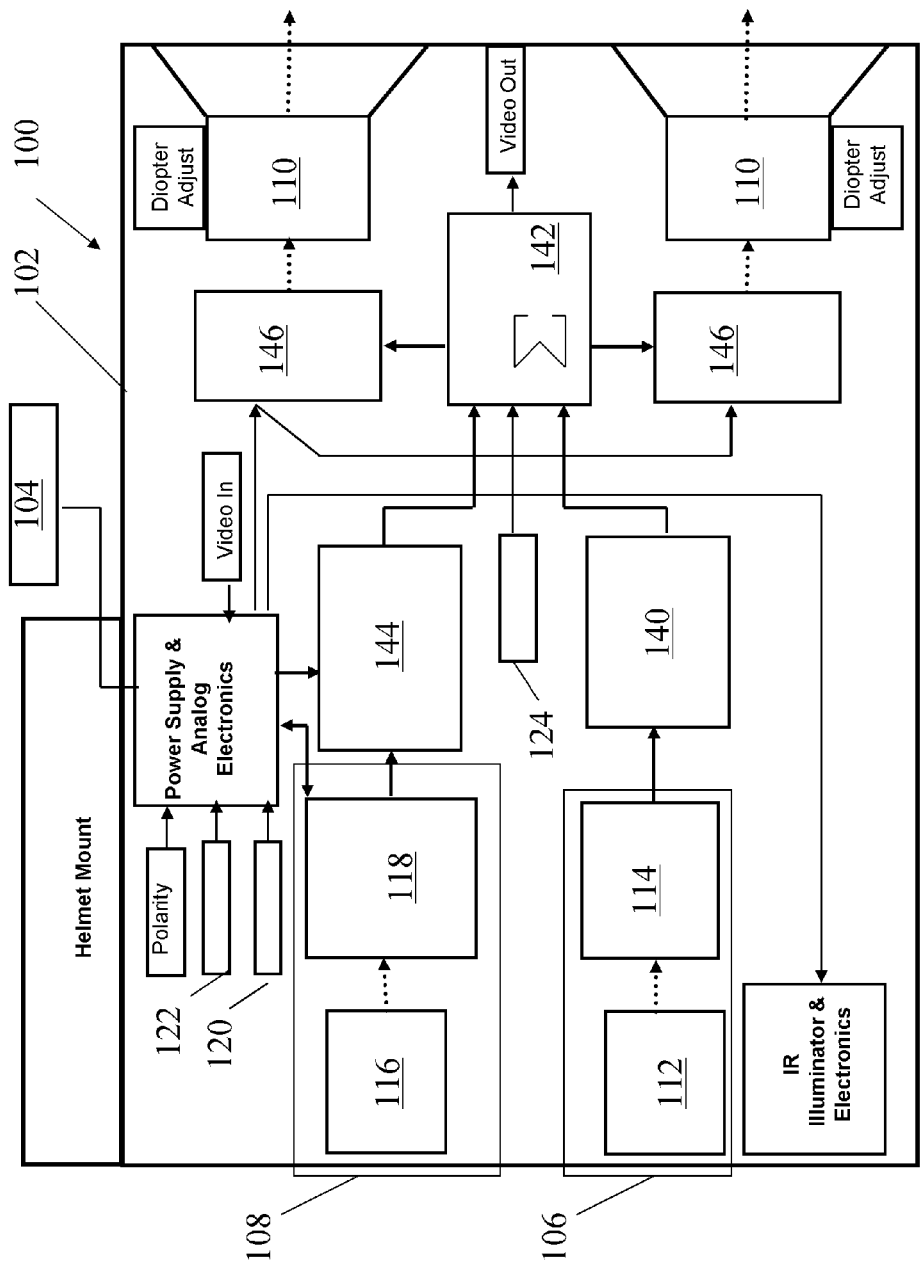
FIG. 1 is a block diagram of an electronically fused night vision system.
Figure 1A:
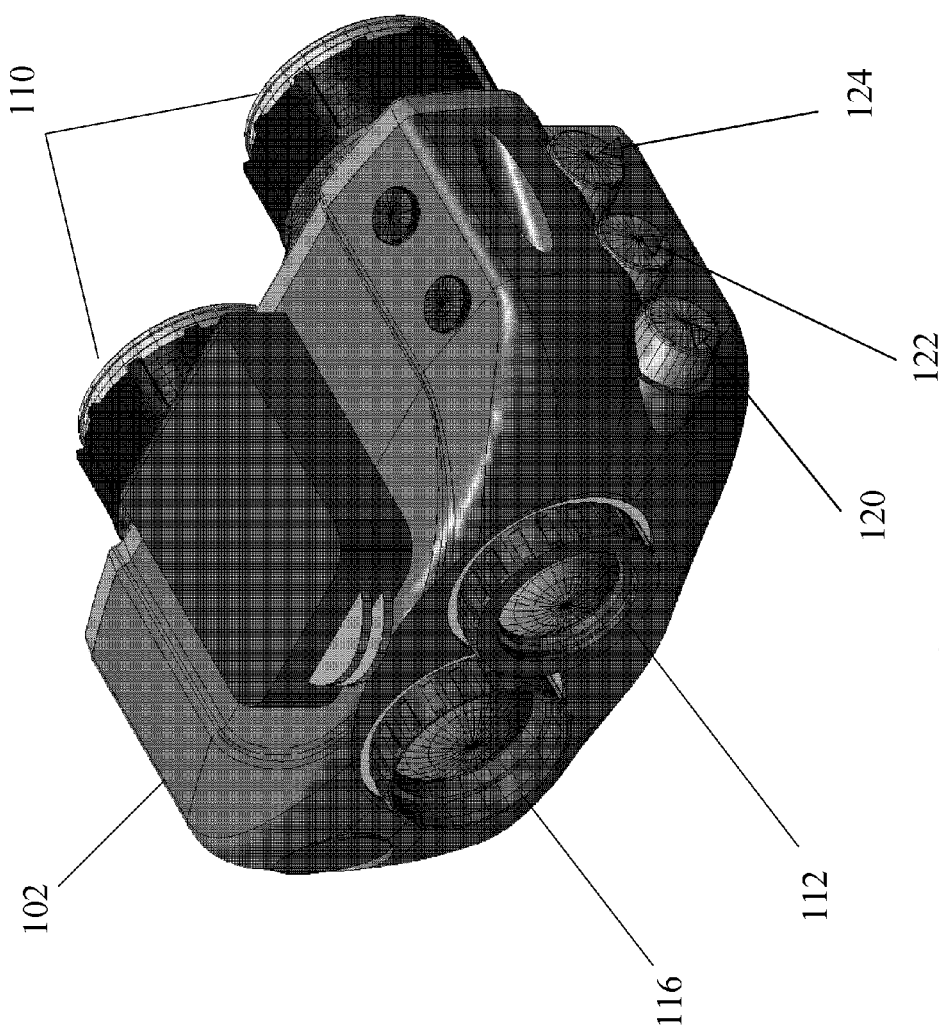
FIG. 1A is an illustration of the fused night vision system of FIGS. 1 and 2.
Figure 2:
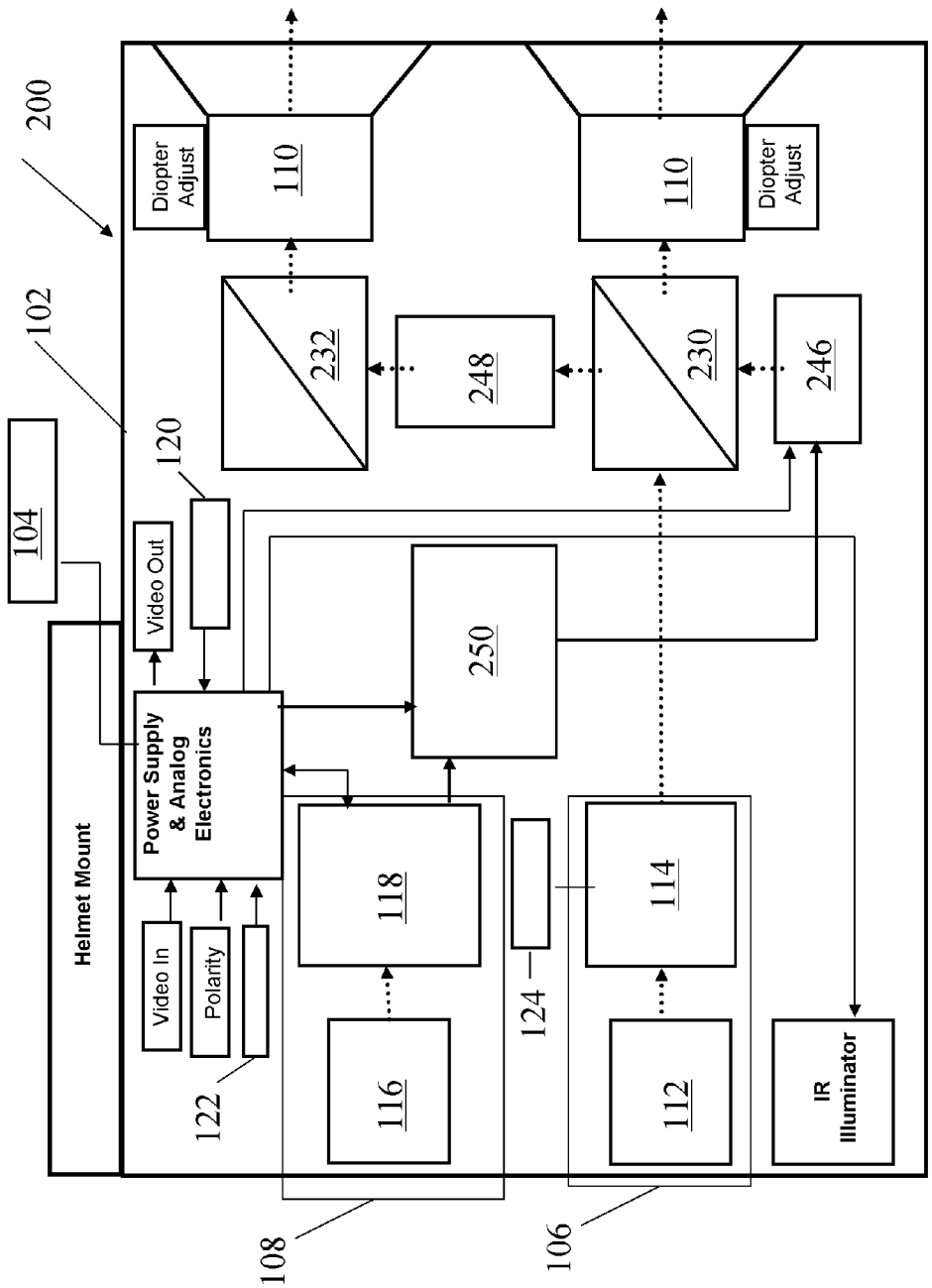
FIG. 2 is a block diagram of an optically fused night vision system.
Figure 3:
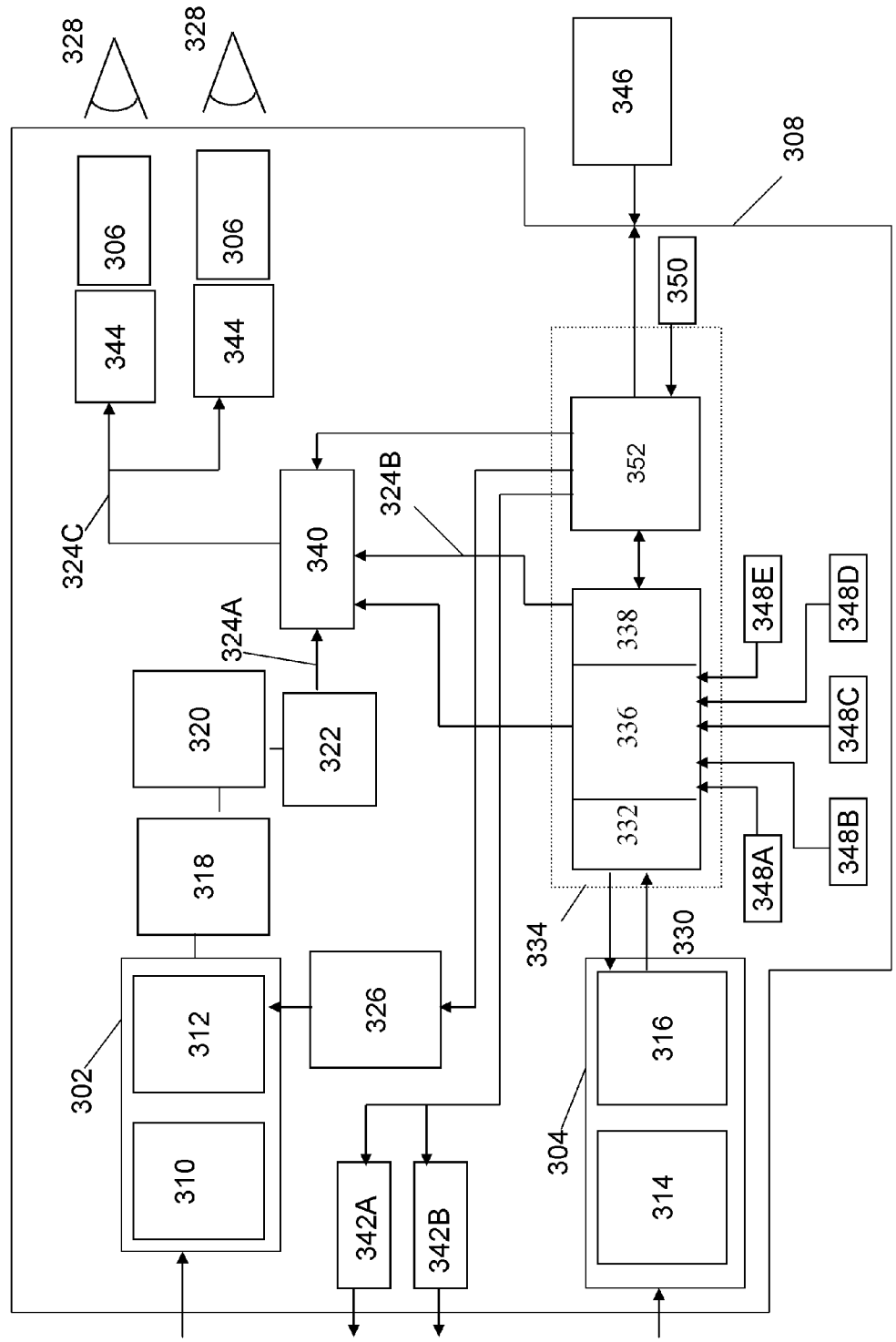
FIG. 3 is a block diagram of a first fusion night vision system consistent with the invention.

FIG. 3 is a block diagram of a first fusion night vision system 300. The electronics and optics may be housed in a housing 308. Information from a first channel ($I^2$) channel 302 and a second channel 304 may be fused together for viewing by an operator 328. A channel may be an optical path through which scene information may travel. The first channel 302 may be configured to process information in a first range of wavelengths (the visible portion of the electromagnetic spectrum from approximately 400 nm to approximately 900 nm) and the second channel 304 may be configured to process information in a second range of wavelengths (from approximately 7,000 nm to approximately 14,000 nm). The low end and the high end of the range of wavelengths may vary without departing from the invention. The first channel 302 may have an objective focus 310 and an image intensification ($I^2$) tube 312. Suitable $I^2$ tubes 312 may be Generation III tubes and are available from Northrop Grumman and ITT. Alternatively, other sensor technologies including near infrared electron bombarded active pixel sensors or short wave InGaAs arrays may be used without departing from the invention. Information from the $I^2$ tube may be resized using a taper 318 and then projected onto a charge-coupled device (CCD) 320. The output from the CCD 320 may then be inputted into a CCD drive 322, which in turn generates an analog video signal 324A. The analog video signal 324A may be inputted into an analog fusion mixer 340.

The second channel 304 may be a thermal channel having an objective focus 314 and an infrared focal plane array 316. The focal plane array may be a U7000J from DRS. An analog signal 330 from the focal plane array 316 may be inputted into an analog-digital circuit 332 and a processor 336, which both may be located on a main circuit card assembly 334. The signal may then be inputted to a digital-analog converter 338 and exported to the analog fusion mixer 340 as a signal 324B. The analog fusion mixer 340 creates a fused video signal 324C possibly containing composite video information. The fused video signal 324C may then be inputted into one or more miniature flat panel displays 344 positioned in front of eyepieces 306. The miniature plat panel displays 344 may be yellow monochrome organic light emitting diode (OLED) microdisplays available from eMagin Corp. of New York, N.Y. as part no. EMA-100116. The eyepiece 306 may have one or more ocular lenses for magnifying and focusing the fused image.

Alternatively, information from the first channel 302 may be provided to only one eyepiece 306 and the fused image provided to the other eyepiece to provide one fused image and one image with just information from the first channel. Likewise, information from the second channel 304 may be provided to only one eyepiece 306 and the fused image provided to the other eyepiece to provide one fused image and one image with just information from the second channel.

The main circuit card assembly 334 may have a power circuit 352 that powers a wide field of view infrared illuminator 342A and a narrow field of view infrared illuminator 342B and controls $I^2$ power supply 326. The power circuit 352 may receive power from a removable battery pack 346.

The fusion night vision system 300 may be called upon by an operator 328 to view a target in a variety of adverse conditions, for example in very low light conditions, through smoke or heavy fog, and sand storms. In each of these conditions the operator 328 may wish to rely more heavily on the first channel 302 than the second channel 304 and in other conditions the user may wish to rely more heavily on the second channel 304 than the first channel 302.

The fusion night vision system 300 may have a plurality of user actuatable actuators including a menu actuator 348A, a scroll up actuator 348B, a scroll down actuator 348C, a scroll left actuator 348D, a scroll right actuator 348E, and a power on/off actuator 350. The scroll up actuator 348B, the scroll down actuator 348C, the scroll left actuator 348D, and the scroll right actuator 348E allow the operator to scroll through menus viewable through the eyepiece 306 and the menu selector actuator 348A allows the operator to make a selection. Power on/off actuator 350 allows the operator to turn the system 300 on and off. The menus may allow the operator to control the illumination of wide field of view infrared illuminator 342A and narrow field of view infrared illuminator 342B, reverse the polarity of the image, i.e. change the light pixels to dark and the dark pixels to light, enable or disable an edge detection filter circuit (to be discussed below), enable or disable a threshold comparator and clamp circuit (to be discussed below), calibrate the system, switch the system into a lower power usage state without turning the system off, increase the perceived mix of thermal to $I^2$ information viewable through the eyepiece 306, decrease the perceived mix of thermal to $I^2$ information viewable through the eyepiece 306, and increase or decrease the brightness of the fused image viewable through the eyepiece 306. The mix of thermal and $I^2$ information viewable through the eyepiece 306 may be adjustable independent of the brightness of the displays 344.

Figure 4A:
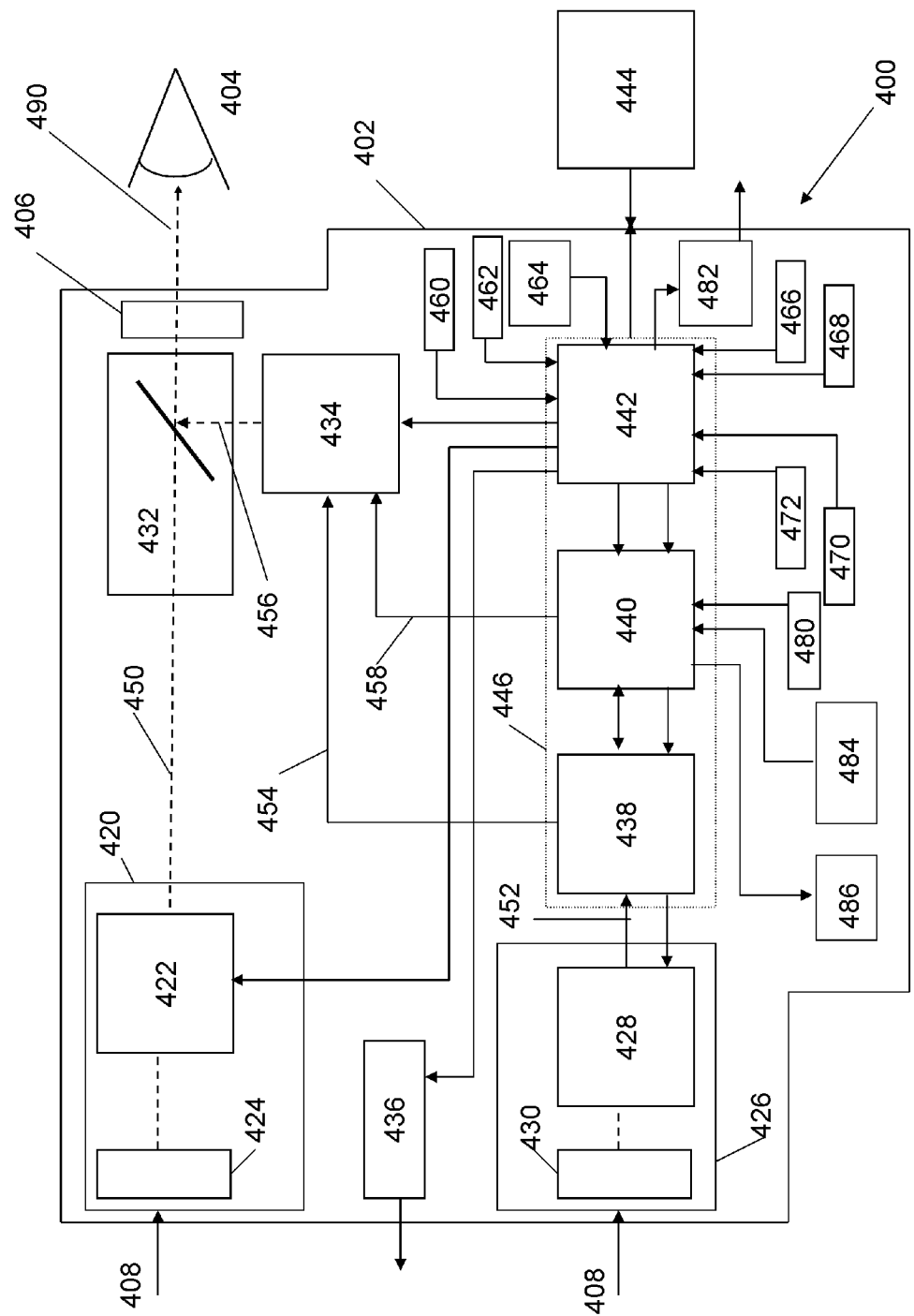
FIG. 4A is a block diagram of a second fusion night vision system configured as a monocular consistent with the invention.
Figure 4B:
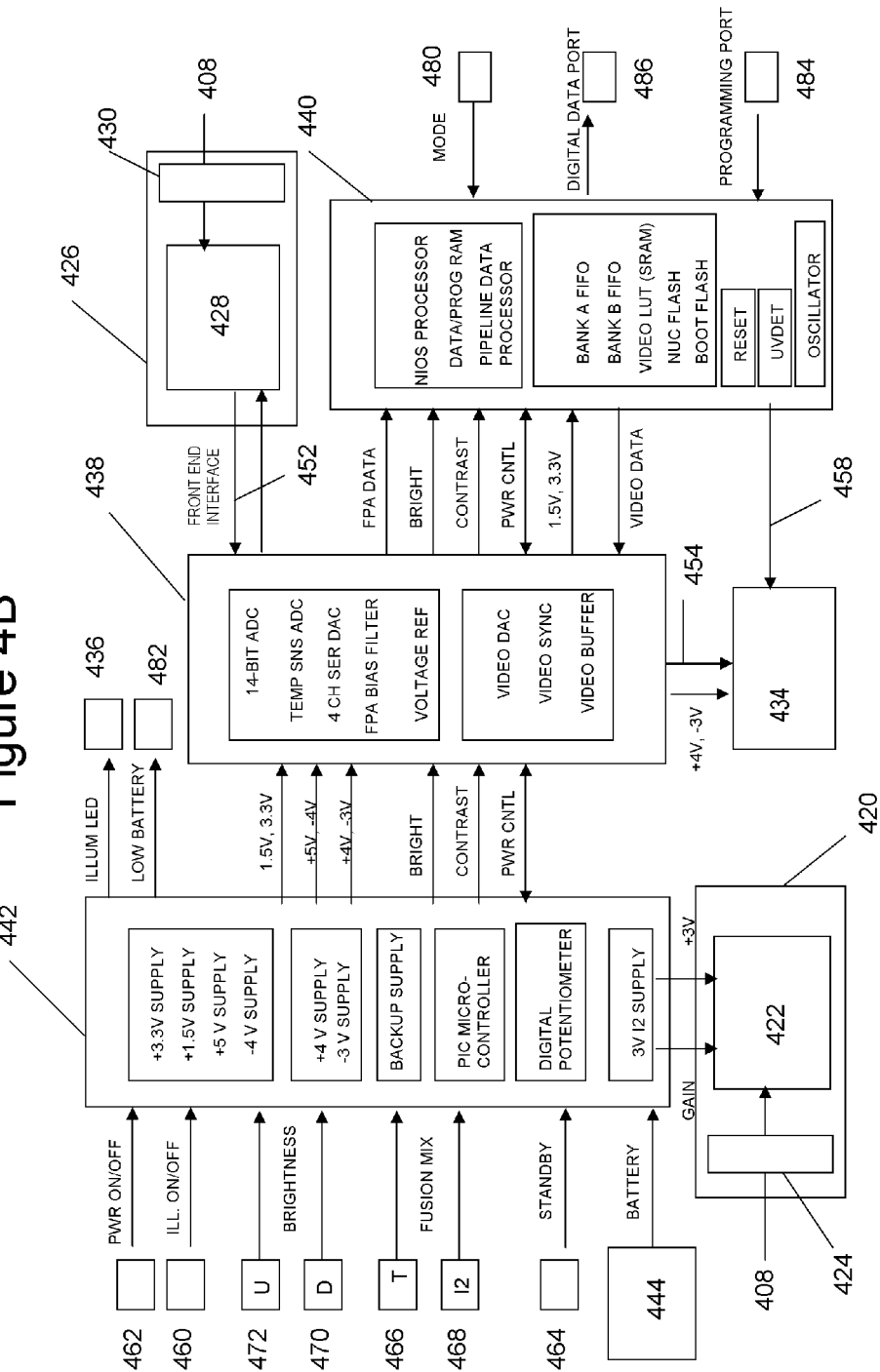
FIG. 4B is a block diagram detailing interconnections between blocks shown in FIG. 4A.
Figure 4C:
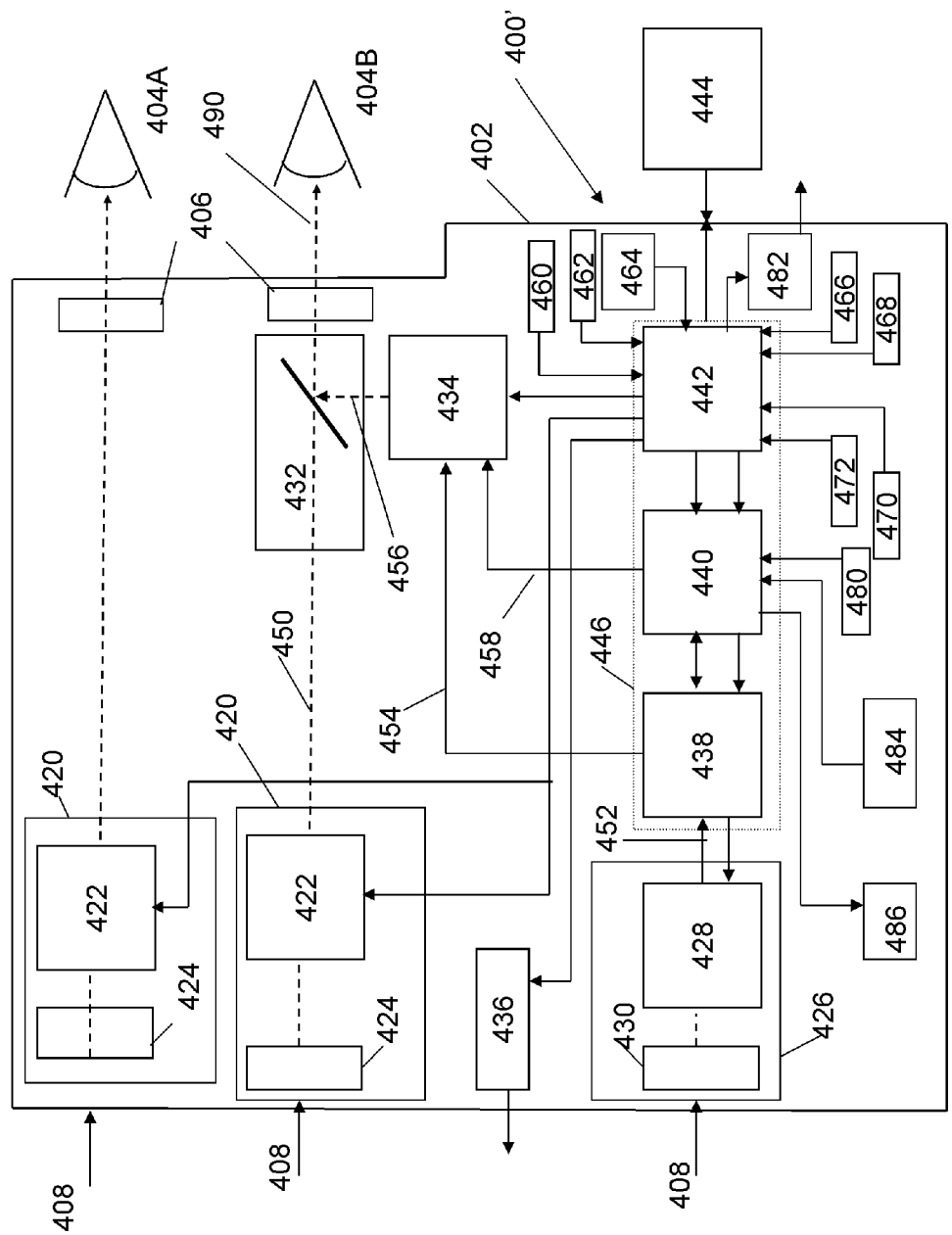
FIG. 4C is a block diagram of the second fusion night vision system configured as a binocular consistent with the invention.

The actuators 348A-E, 350 may employ a silicone overlay over tactile dome switches. The overlay may be coupled to the housing 402 to seal out moisture and particulates and the dome switches may be coupled to processor 336. Alternatively, the system 300 may utilize dedicated actuators as discussed in relation to FIG. 4. FIG. 4A is a block diagram of a second fusion night vision system configured as a monocular 400 and FIG. 4C is a block diagram of the second fusion night vision system configured as a binocular 400' consistent with the invention. An operator 404 looking through an eyepiece 406 within the housing 402 may be able to see a fused image 490 of a target 408. Enclosed at least partially within the housing 402 may be a first channel 420, a second channel 426, combiner optics 432, a display 434, an illumination LED 436, an analog circuit card assembly 438, a digital circuit card assembly 440, and a power circuit card assembly 442. The analog circuit card assembly 438, the digital circuit card assembly 440, and the power circuit card assembly 442 may be combined on a single flexible circuit assembly 446. The display 434 may be a yellow monochrome organic light emitting diode (OLED) microdisplay available from eMagin Corp. as part no. EMA-100116. The fusion night vision system 400, 400' may be powered by a separate and removably disconnectable battery pack 444. The first channel 420 may have an $I^2$ tube 422 and an $I^2$ objective focus 424 and the second channel 426 may have an infrared focal plane array 428 and a thermal objective focus 430. The focal plane array may be a U7000J from DRS. The first channel 420 may be configured to process information in a first range of wavelengths (the visible portion of the electromagnetic spectrum from approximately 400 nm to approximately 900 nm) and second channel 426 may be configured to process information in a second range of wavelengths (from approximately 7,000 nm to approximately 14,000 nm). Suitable $I^2$ tubes 422 may be Generation III tubes and are available from Northrop Grumman and ITT. Alternatively, an InGaAs array may replace the Infrared Focal Plane Array 428 without departing from the invention.

Information 450 from the first channel 420 may be directed into optics 432, for example a partially reflective beam splitter and information 452 from the second channel 426 may be directed into focal plane array electronics on the analog circuit card assembly 438. An analog video out signal 454 from the analog circuit card assembly 438 may be inputted into the display 434. A serial bus 458 coupled to the digital circuit card assembly 440 may control the size, resolution, and offset of the display 434. An output 456 from the display 434 may be directed onto the beam splitter located within optic 432 and directed towards the operator 404.

The fusion night vision system 400,400' may have a plurality of user actuatable actuators including illumination LED actuator 460, power on/off actuator 462, stand-by actuator 464, increase perceived mix of thermal to $I^2$ information actuator 466, increase perceived mix of $I^2$ to thermal information actuator 468, brightness down actuator 470, brightness up actuator 472, and thermal mode select actuator 480. The actuators may employ a silicone overlay over tactile dome switches. The overlay may be coupled to the housing 402 to seal out moisture and particulates and the dome switches may be coupled to a processor. The increase perceived mix of thermal to $I^2$ information actuator 466 and the increase perceived mix of $I^2$ to thermal information actuator 468 may be fixed together and rotatable about a pivot. Rotation of the combined actuator in a first rotational direction increases the perceived mix of information in the eyepiece from the $I^2$ channel and rotation of the actuator in a second rotational direction increases the perceived mix of information in the eyepiece from the thermal channel. The increase or decrease in the perceived mix of information in the eyepiece from the $I^2$ channel can be changed continuously (ramp) or in discrete steps by the processor.

The illumination LED actuator 460 may turn illumination LED 436 on and off. A single actuation of the illumination LED actuator 460 may turn the illuminating LED 436 on as long as the actuator 460 is actuated and a double tap (two actuations within a short period of time, for example 500 msec, may cause the illuminating LED 436 to latch on. A subsequent actuation of illumination LED actuator 460 may turn the illuminating LED 436 off. Stand-by actuator 464 may switch the system 400 to a lower power usage state without turning the system 400, 400' off. The thermal mode select actuator 480 allows the user to reverse the polarity of the image i.e. change the light pixels to dark and the dark pixels to light, enable or disable the edge detection filter circuit (to be discussed below), and calibrate the system. The fusion night vision system 400, 400' may also have a low battery signal generator 482. The low battery signal generator 482 may generate a visible or an audible signal to the operator to signal that the batteries in the battery pack 444 are low. Alternatively, the low battery signal may be displayed in the display 434. The fusion night vision system 400, 400' may also have a programming port 484 and a digital data port 486 for transferring data. Alternatively, the system 400 may utilize scroll actuators as discussed in relation to FIG. 3.

The fusion night vision system 400,400' may be called upon by the operator 404 to view the target 408 in a variety of adverse conditions, for example in very low light conditions, through smoke or heavy fog, and sand storms. In each of these conditions the operator may wish to rely more heavily on the first channel 420 than the second channel 426 and in other conditions the user may wish to rely more heavily on the second channel 426 than the first channel 420. The increase perceived mix of thermal to $I^2$ information actuator 466 and the increase perceived mix of $I^2$ to thermal information $I^2$ image actuator 468 may be actuated to adjust the perceived mix of information from the first channel 420 and the second channel 426 viewable through the eyepiece 406, while generally maintaining the brightness of the display 434. At one extreme the viewable image contains generally 100% image intensification information, at the other extreme the viewable image contains generally 100% thermal information, and in between the two extremes, the power circuit card assembly 442 controls the mix of $I^2$ and thermal information to the eyepiece 406. The actuators 466, 468 may be coupled to a microcontroller on the power circuit card assembly 442 that controls the gain of the $I^2$ tube 428 and the contrast and brightness of the thermal image presented in display 434. The microcontroller may control a digital potentiometer coupled to the gain control input of the $I^2$ tube. As noted above the increase or decrease may be ramped or stepped. The increase perceived mix of thermal to $I^2$ information actuator 466 and the increase perceived mix of $I^2$ to thermal information actuator 468 may be positioned on opposite ends of a rocker mechanism to prevent simultaneous actuation.

Figure 5:
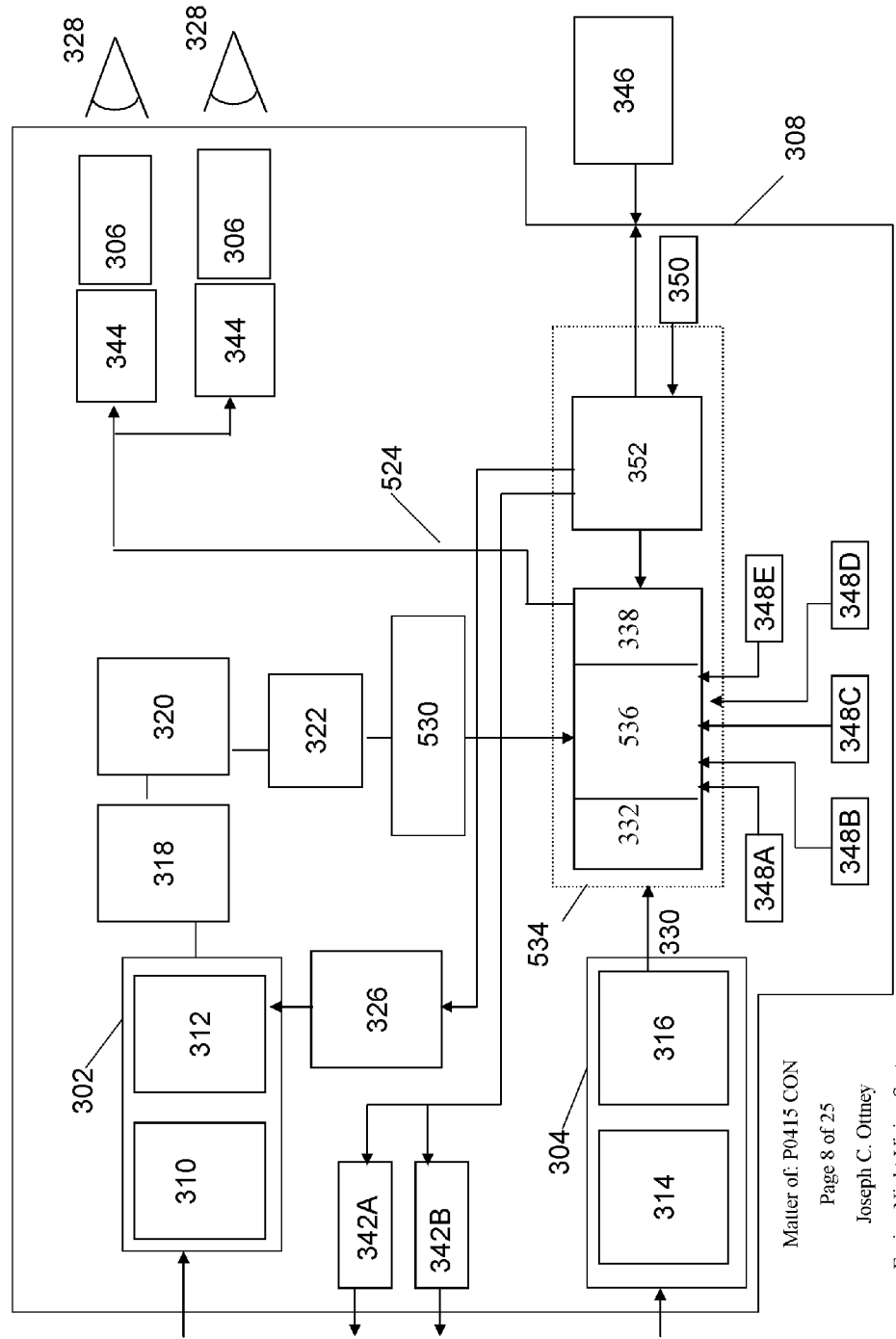
FIG. 5 is a block diagram of a third fusion night vision system consistent with the invention.

FIG. 5 is a block diagram of a third fusion night vision system 500 consistent with the invention. FIG. 5 may have similar components as FIG. 3, except as noted here. The analog output of the CCD drive 322 may be inputted into an analog-to-digital circuit 530 prior to being inputted into a digital fusion mixer 536. The digital fusion mixer 536 may receive a digital signal from analog-to-digital circuit 332 with the thermal information, combine it with the $I^2$ information, and export it to the digital-to-analog circuit 338. A fused video signal 524 may then be fed into a miniature flat panel display 344 positioned in front of eyepieces 306 for viewing by the operator 328. The fused video signal 524 may also include composite video information.

Alternatively, information from the first channel 302 may be provided to only one eyepiece 306 and the fused image provided to the other eyepiece to provide one fused image and one image with just information from the first channel. Likewise, information from the second channel 304 may be provided to only one eyepiece 306 and the fused image provided to the other eyepiece to provide one fused image and one image with just information from the second channel.

Figure 6:
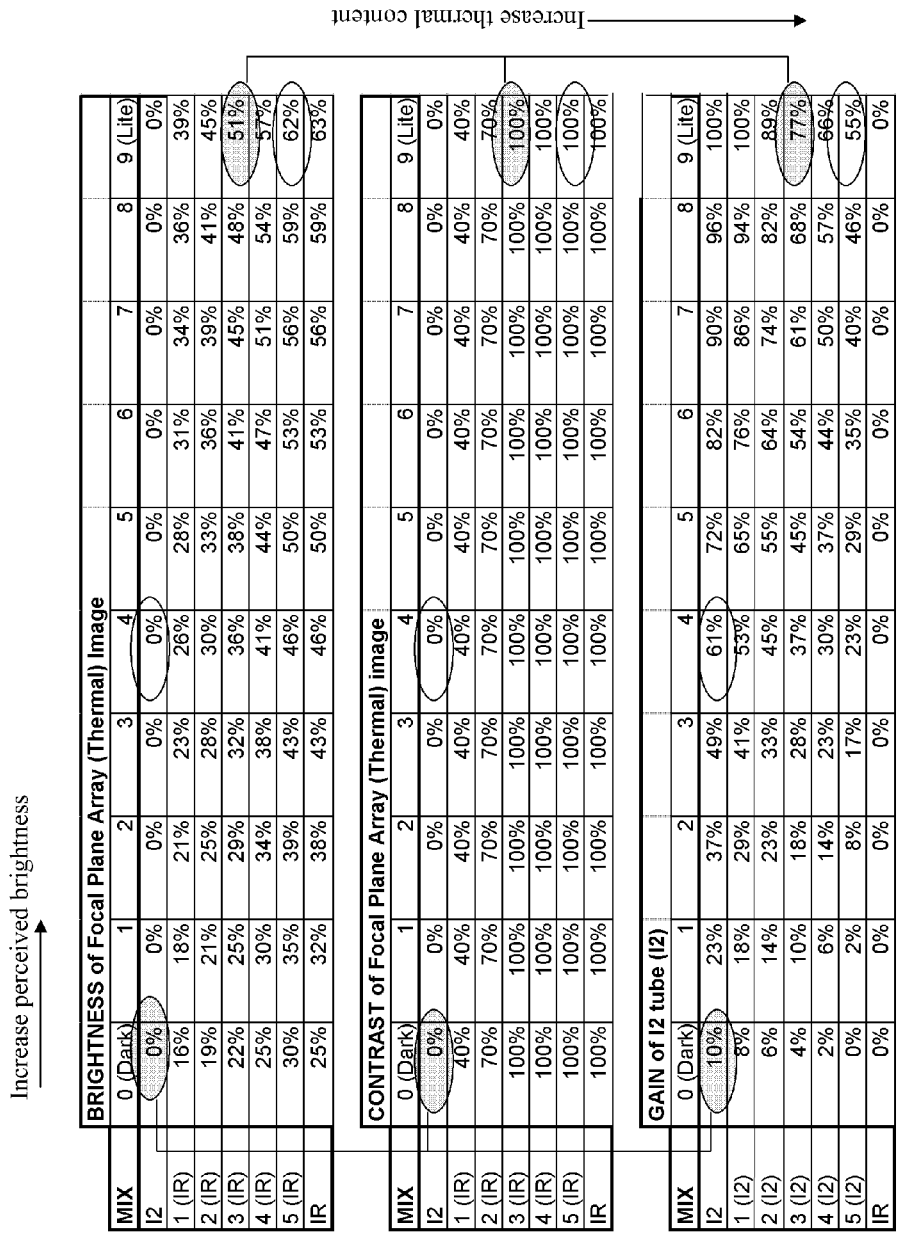
FIG. 6 is a look up table consistent with the invention.

FIG. 6 shows a lookup chart for use in the invention. The systems 300, 400, and 500 may be configured to maintain a perceived brightness of the fused image over a range of $I^2$ and thermal mixes. The brightness of the fused image perceived through the eyepiece 306 and 406 may be adjusted using one of the menu selector actuator 348A-348E in FIG. 3 or through brightness down actuator 470 and brightness up actuator 472 in FIG. 4. The fusion night vision systems 300, 400, 400' and 500 may be configured to control the brightness sometimes referred to as black level of the thermal image, the contrast (or gain) of the thermal image, and the gain of the $I^2$ tube(s) to maintain the desired perceived brightness as perceived by the user.

The fusion night vision systems 300, 400, 400' or 500 may be capable of having a plurality of discrete mixes in between 100% image intensification ($I^2$) and 100% thermal (IR). As shown in FIG. 6 there may be (5) steps between position I2 in which the viewer generally only obtains information from the first channel and position IR in which the user generally only obtains information from the second channel. The number of steps between 100% image intensification and 100% thermal information may be increased or decreased based on user desirability without departing from the invention. The actual brightness level of the focal plane array image may range from 0-63% of its maximum brightness, the contrast of the focal plane array image may range from 0-100% of its maximum contrast, and the gain of the $I^2$ tube may range from 0-100% of its maximum gain. Display brightness refers to the average of the image data and contrast refers to the min-to-max difference of the image data. The average of the image data is the sum of the individual pixel values divided by the number of pixels. Perceived brightness is the brightness of the fused image as viewed by the viewer through the eyepiece(s). The ranges and values are illustrative and other ranges and values may be selected without departing from the invention.

As a first illustrative example, for a "dark" (0) perceived brightness of the fused image, where the operator desires only $I^2$ information (I2), the brightness of the focal plane array may be set at 0%, the contrast of the focal plane array may be set at 0%, and the gain of the $I^2$ tube may be set at 10% of its maximum value.

To increase the perceived brightness of the fused image while maintaining the same mix ratio ($I^2$ only), the operator may actuate the brightness up actuator 472 or the appropriate menu controls through actuator 348A-E. The system may then adjust the brightness and contrast of the focal plane array image and the gain of the of the $I^2$ tube according to the look up chart in FIG. 6. Accordingly, if the operator selects a "4" level of perceived brightness, the system may set the gain of the $I^2$ tube at 61% of its maximum and leave the brightness and contrast of the focal plane array at 0%.

As a second illustrative example, for a "light" (9) perceived brightness, where the operator desires a mix of $I^2$ and thermal information (3), the brightness of the focal plane array may be set at 51% of maximum value, the contrast of the focal plane array may be set at 100% or maximum, and the gain of the $I^2$ tube may be set at 77% of its maximum.

To increase the thermal content in the fused image while maintaining the same perceived brightness (lite 9), the operator may actuate the increase perceived mix of thermal to $I^2$ information actuator 466 or the appropriate menu controls through actuator 348A-E. The system may then adjust the brightness and contrast of the focal plane array and the gain of the $I^2$ tube according to the look up chart in FIG. 6. Accordingly, if the operator increases the perceived thermal content (mix=5), the system may set the brightness of the focal plane array to 62% of its maximum, the contrast of the focal plane array at 100% of its maximum, and the gain of the $I^2$ tube at 55% of its maximum.

In an alternative involvement, the mixed ratio of image intensification information and thermal information may be continuously variable, and not have discrete individual steps.

Figure 6A:
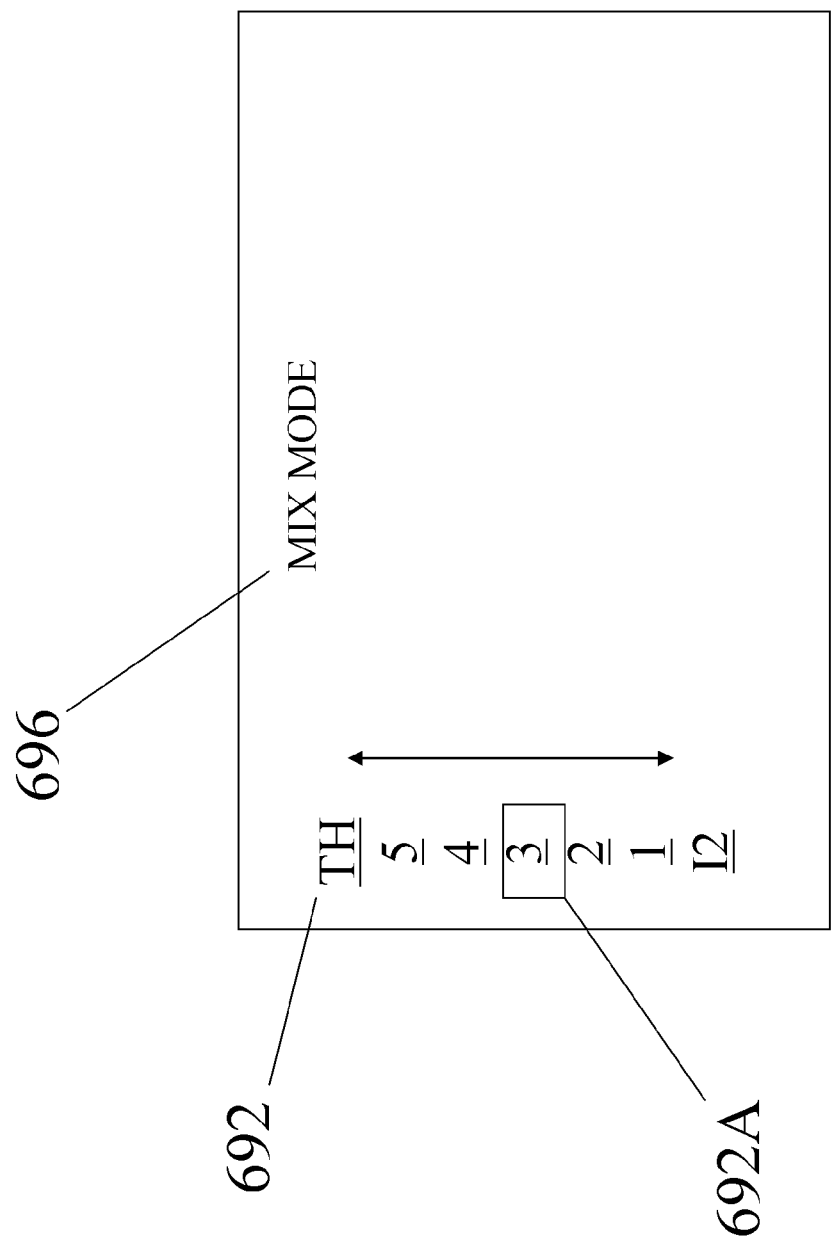
FIG. 6A is a first illustration of graphics viewable through a fusion night vision system consistent with one embodiment of the invention.

FIG. 6A is a first illustration of graphics viewable through a fusion night vision system consistent with one embodiment of the invention. The graphics may be displayed on the display(s) 344, 434 and viewed by an operator through the eyepiece(s) 306, 406. A first visual indicator 692 may display a range of mixes of $I^2$ and thermal information available to the operator. The range may be from 0% $I^2$ information/100% IR (thermal) information to 100% $I^2$ information/0% IR information. A second visual indicator 692A may indicate the present mix ratio. As the increase perceived mix of thermal to $I^2$ information actuator 466 or increase perceived mix of $I^2$ to thermal information actuator 468 is actuated (or the appropriate actuator 348A-E), the second visual indicator 192A may move closer to one of the extremes. A mode indicator 696 may indicate the mode the night vision system is in. The visual indicators 692, 692A and the mode indicator 696 may be displayed for a predetermined period of time after an actuator is actuated, and then extinguish.

Figure 6B:
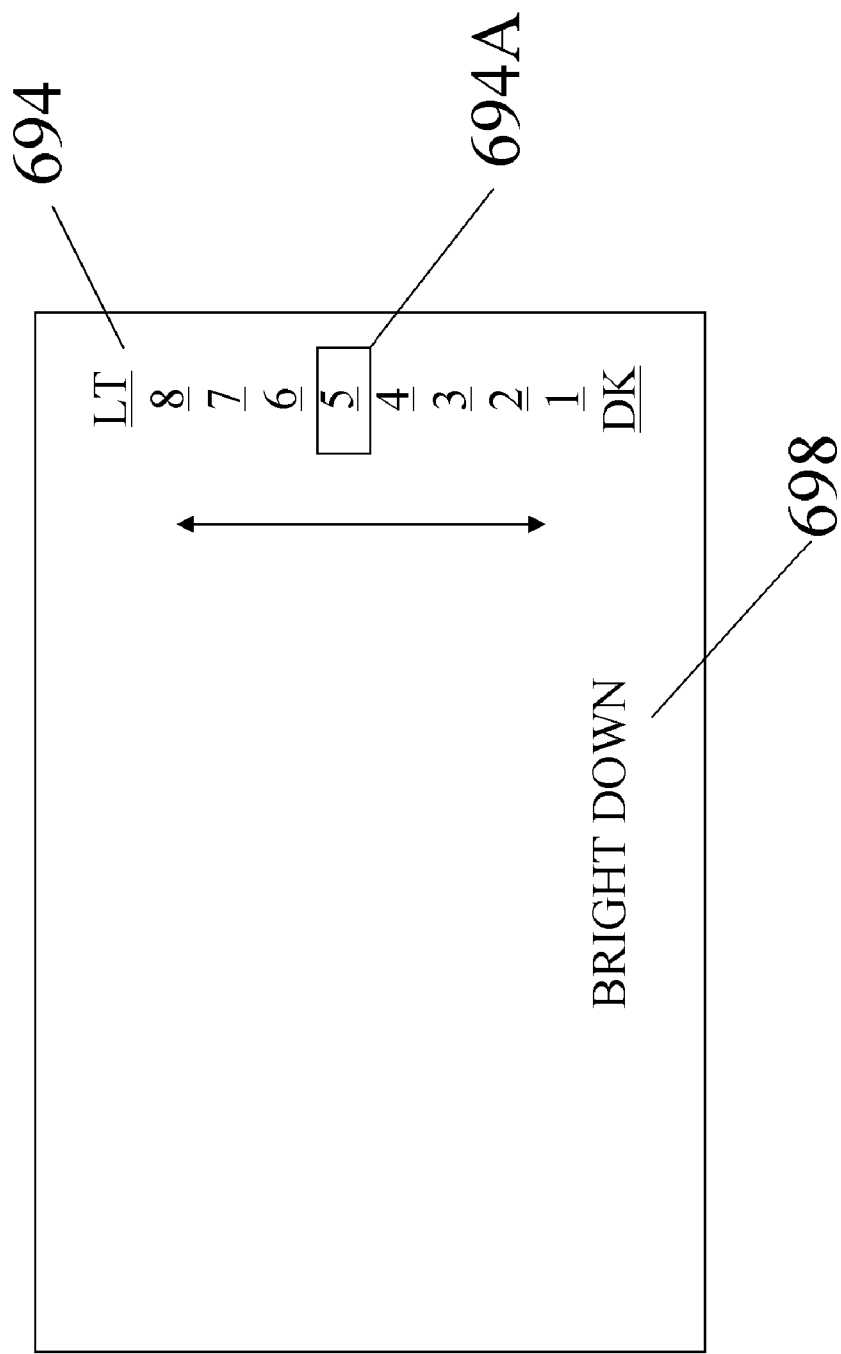
FIG. 6B is a second illustration of graphics viewable through a fusion night vision system consistent with one embodiment of the invention.

FIG. 6B is a second illustration of graphics viewable through a fusion night vision system consistent with one embodiment of the invention. The graphics may be displayed on the display(s) 344, 434 and viewed by an operator through the eyepiece(s) 306, 406. A third visual indicator 694 may display a range of perceived brightness of the fused $I^2$ and IR image available to the operator. The range may be from "lite" to "dark". A fourth visual indicator 694A may indicate the present brightness. As the brightness down actuator 470 or brightness up actuator 472 is actuated (or the appropriate actuator 348A-E), the fourth visual indicator 694A may move closer to one of the extremes. A brightness direction indicator 698 (e.g. "BRIGHT DOWN" OR "BRIGHT UP) may indicate that the brightness is being adjusted. The visual indicators 694, 694A and brightness direction indicator 698 may be displayed for a predetermined period of time after an actuator is actuated, and then extinguish. Alternatively, the mix ratio and brightness may be displayed with other graphics including numbers and icons.

Figure 7A:
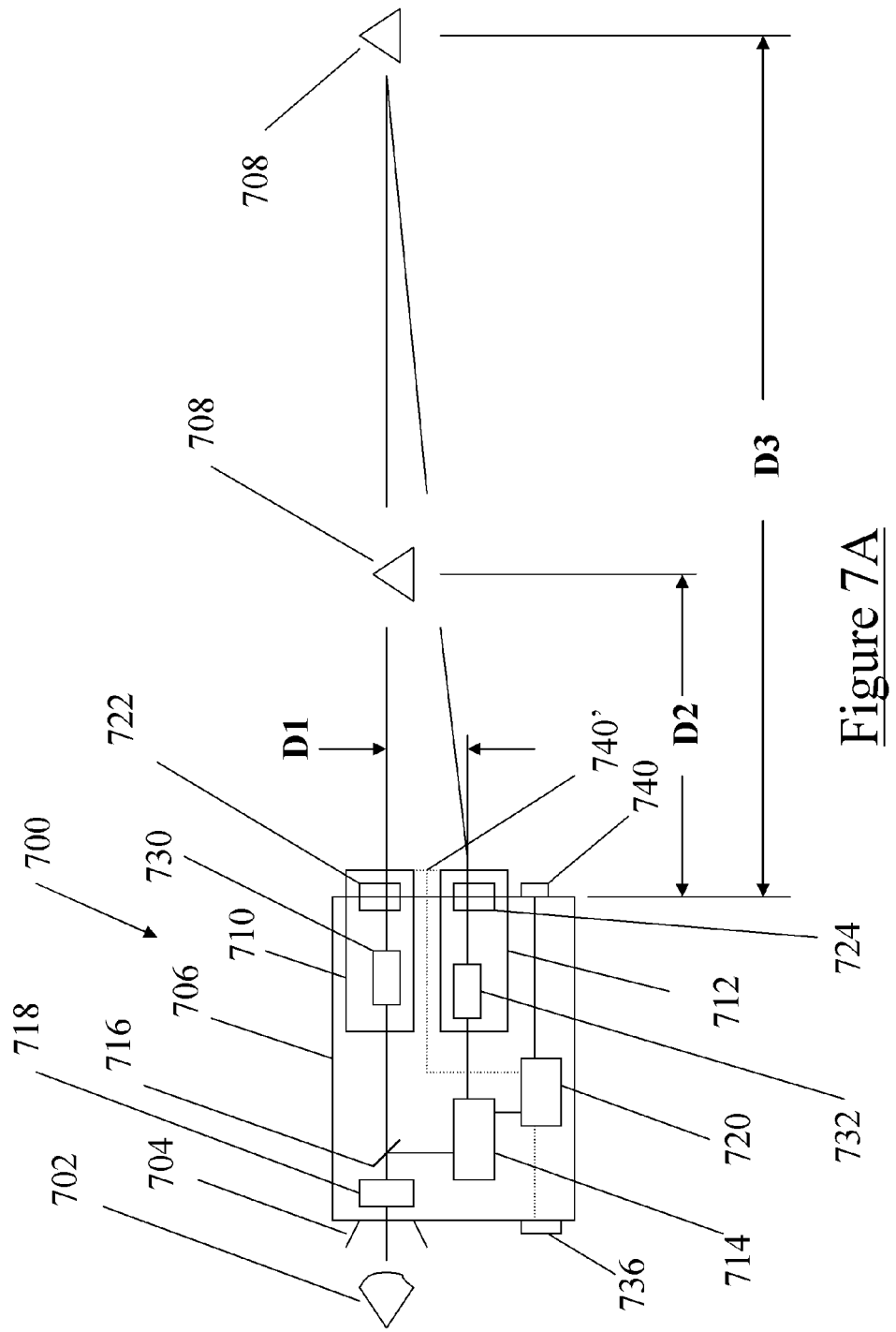
FIG. 7A is block diagram of a fourth fusion night vision system consistent with the invention.
Figure 8:
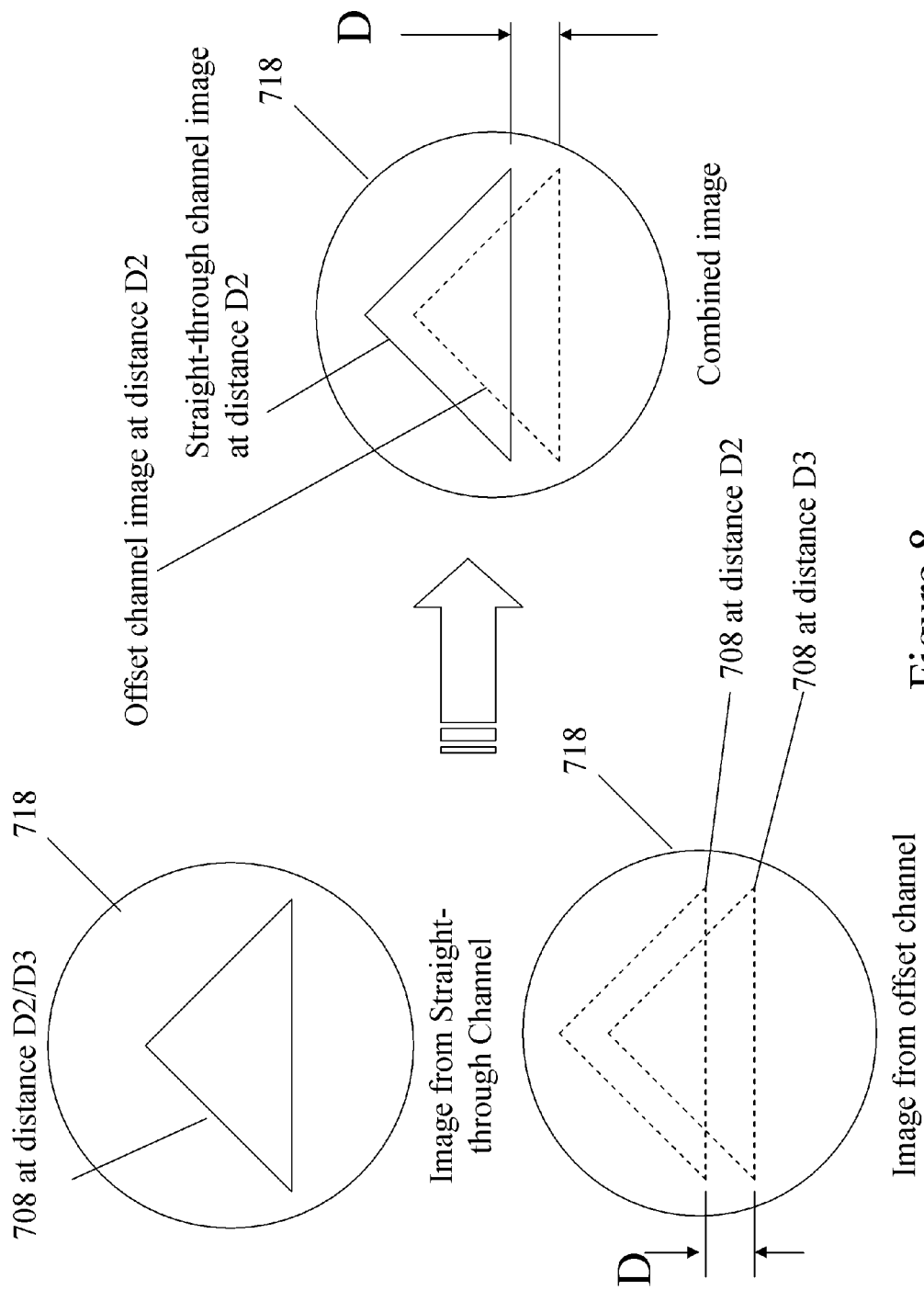
FIG. 8 is an illustration of the problem overcome by the fusion night vision system of FIG. 7.

As shown in FIGS. 7A and 8, fusion night vision systems having the thermal channel offset from the $I^2$ channel can have a parallax problem at either close or far distances. The problem arises because the longitudinal axis of the thermal channel and the longitudinal axis of the $I^2$ channel are aligned such that the fused image of the target at a predetermined distance is aligned in the eyepiece. At distances different than the predetermined distance, the thermal and $I^2$ images are offset in the eyepiece by a distance D. This offset distance increases as the target is moved further inward or outward from the predetermined distance.

FIG. 7A is an illustration of a fifth fusion night vision system 700 consistent with the invention. The $I^2$ information and the thermal information may be optically fused as in FIGS. 4A and 4C. An operator 702 looking through an eyecup 704 secured to a housing 706 is able to see a target 708 at a distance D3 from the fusion night vision system 700. Enclosed at least partially within the housing 706 may be a first channel 710 displaced vertically from a second channel 712, a display 714, an image combiner 716, an eyepiece 718, and a processor 720. Alternatively, the first channel 710 may be horizontally displaced from the second channel 712. The optical axis of the first channel 710 and the optical axis of the second channel 712 are shown offset by a distance D1. The eyepiece 718 may have one or more ocular lenses for magnifying and focusing the fused image of the target. The first channel 710 may be an image intensification channel having an $I^2$ tube 730 and an objective focus 722 and the second channel 712 may be a thermal channel having a focal plane array 732 and an objective focus 724. The output of the focal plane array 732 may be displayed in the display 714. The output from the display 714 and the output from the $I^2$ tube 730 may be fused in the image combiner 716 for viewing by the operator 702. The processor 720 may be coupled to an electronic 740 or a mechanical 740' range finder for determining the distance D2 from the fusion night vision system 700 to the target 708.

FIG. 8 shows the location of an image in the eyepiece 718 of a fusion night vision system 700 for an object 708 located at a distance D2 and D3 from the fusion night vision system 700. The vertical location of the image in the eyepiece through the straight-through channel, the $I^2$ channel in FIG. 7, does not shift up or down as the distance to target changes. However, the vertical location of the image in the eyepiece 718 through the offset channel, the thermal channel in FIG. 7, does shift up or down as the distance to target changes. The image of the object 708 shifts upward a distance D in the eyepiece when the object 708 is moved from the predetermined distance D3 from the fusion night vision system 700 to the shorter distance D2, resulting in a misregistration of the thermal and the I2 information in the eyepiece 718. If the processor 720 did not offset the image in the display 714 to compensate for this change in position, the operator 702 would see the image from the straight-through channel (solid line) offset from the image from the offset channel (dotted line).

The optical axis of the first channel 710 and the second channel 712 may be factory aligned such that the fused image of the target 708 from the thermal channel 712 and the $I^2$ channel 710 are aligned on the image combiner 716 when the target 708 is at the predetermine distance D3, for example infinity. Note that the channels can be offset in the horizontal direction or the vertical direction. When the channels are offset in the vertical direction, the processor 720 compensates by offsetting images up or down in the display 714 and when the channels are offset in the horizontal direction, the processor 720 compensates by offsetting images left or right in the display 714 to ensure thermal image and the $I^2$ image are aligned when viewed through the eyepiece 718.

Alternatively, the $I^2$ information and the thermal information may be electronically fused as in FIG. 3 and FIG. 5 with the processor offsetting a selected one of the $I^2$ information and the thermal information in a display which is located in the optical path of the eyepiece 718.

The display 714 is made up of pixels arranged in rows and columns. When the object 708 is at a distance D2, the processor 720 receives distance to target information from the range finder 740, 740' and shifts the thermal or $I^2$ image in the display 714 up or down (or left to right) one or more rows (or columns) based on whether the object 708 is closer to or further away from the predetermined distance D3, typically closer to. The processor 720 may use a look-up table or an algorithm to determine the proper shift for the actual target distance.

Figure 9:
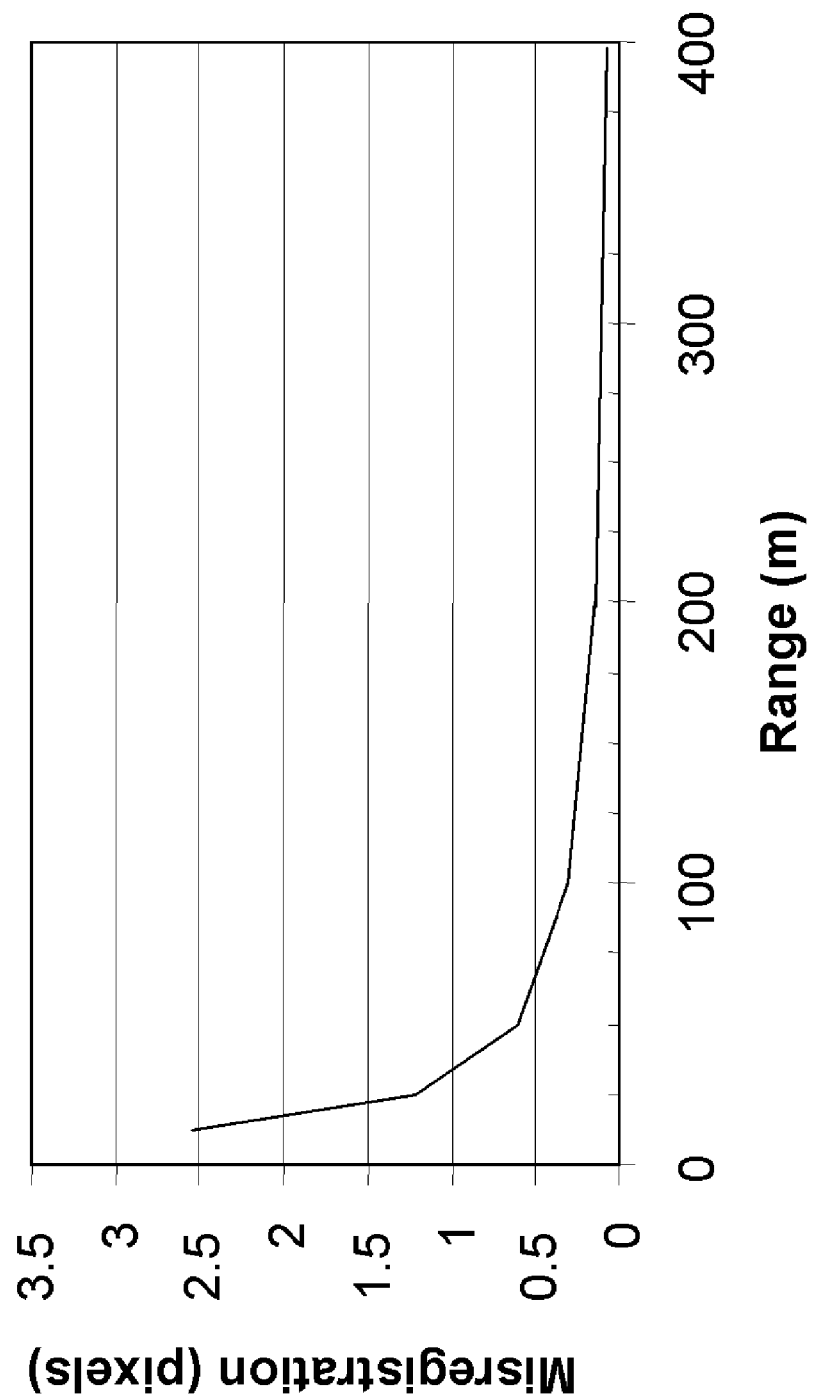
FIG. 9 is a plot of misregistration of pixels as a function of distance to target for a fusion night vision system consistent with the invention.

FIG. 9 is a plot of misregistration as a function of distance to target for a fusion night vision system with a first optical axis offset from the second optical axis by an exemplary distance of ~40 mm. At distances greater than about 100 meters, the misregistration of the $I^2$ and thermal images is less than about ¼ pixel. However, at 25 meters the processor 720 may shift one of the images on the display 714 approximately (1) pixel in order to get alignment and at 10 meters the processor 720 may shift one of the images on the display 714 approximately (3) pixels.

The range finder 740, 740' may utilize an electrical circuit to send out a signal/pulse, for example radar, to bounce off the object in order to acquire the distance to target or it may rely on a mechanical circuit to acquire the distance. A mechanical system may require the operator to focus one of the objective focus 722, 724 on the target and a linear or rotational position sensor coupled to the lens could be used to determine the distance to target (discussed in further detail below). Alternatively, a mechanical circuit may include a linear or rotary potentiometer mechanically coupled to one of the objective focus 722, 724. Alternatively, the night vision fusion system 700 may have one or more actuators 736 coupled to the processor 720 that enables the operator 702 to manually shift the image up or down (or left to right) in the display 714 until the thermal image and the $I^2$ image align. In an alternative embodiment, the system may accept inputs from a user regarding the distance to target. The input may be received through a near/far actuator or a menu selection. The system may be designed so the operator selects the far mode when the object being viewed is greater than 10 meters away and the operator selects the near mode when the object being viewed is less than 10 meters away. Distances other than 10 meters may be chosen without departing from the invention. The fusion night vision system may also incorporate multiple distance choices, for example close, less than 5 meters; mid range, 5-20 meters; and long range, greater than 20 meters, without departing from the invention.

FIG. 7B is a schematic of an autonomous parallax correction circuit and FIG. 7C is a first switch state diagram consistent with the invention. Sensors SW1, SW2, for example Hall effect switches, may be located in the housing 706 adjacent a rotatable focus ring 750 that surrounds an objective focus 754. The user can rotate the focus ring 750 clockwise or counter-clockwise from near N to far F as the user attempts to focus on a target. As the focus ring 750 is rotated the state of the sensors SW1, SW2 may be read by the processor 720. The objective focus 754 may be the $I^2$ objective focus 722 or the thermal objective focus 724 shown in FIG. 7. A series of magnets 752 in close proximity, or a single arcuate magnet, may be coupled to the focus ring 750 in an arcuate path. The magnets 752 may be located in holes formed in the focus ring 750. The location and spacing of the sensors relative to the magnets may depend on the angular rotation of the focus ring 750 from near N to far F. The location of the sensors SW1, SW2 and the magnet(s) 752 may also be swapped without departing from the invention.

FIG. 7D is a first parallax correction look-up table consistent with the invention. As the distance to target changes, the processor 720 may cause the thermal image to shift on the display a predetermined number of pixels so as to align the thermal image and the $I^2$ image when viewed through the eyepiece 718. For example, when the objective focus 754 is focused on a target 708 that is 0-4 meters away, the magnet(s) 752 may be disposed adjacent both sensors SW1, SW2. The processor 720 could then shift the thermal image ten (10) pixels up, down, left, or right depending on the relative location of the first channel 710 and the second channel 712. When the user rotates the focus ring 750 to focus on a target 708 that is 4-8 meters away, the processor 720 could then shift the thermal image six (6) pixels and when the focus ring 750 is focused on a target 708 that is greater than 8 meters away, the processor 720 could then not shift the thermal image. The processor may have built-in hysteresis to reduce problems at distance to target transitions.

Figures 7E, 7F:
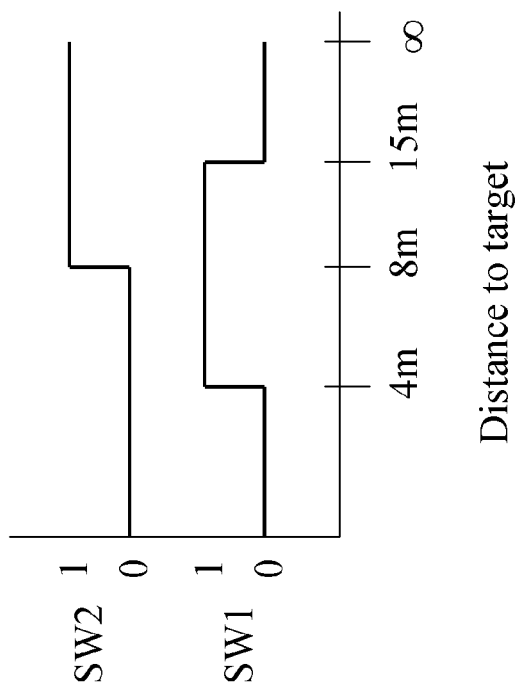
FIG. 7E is a second switch state diagram consistent with the invention.
FIG. 7F is a second parallax correction look-up table consistent with the invention.

As shown in FIGS. 7E and 7F, the distance to target ranges, the state of the sensors, and the associated pixel shift may be changed and additional switches may be added without departing from the invention.

The output of a thermal channel may be a digital image comprising an array of integer or real and/or complex numbers represented by a finite number of bits, for example 10 bits. These bits may represent temperature gradients as small as 0.025° C. and are typically displayed as white, black or shades of gray pixels, although the bits can also be converted to colored pixels. White pixels are typically used to display hotter objects and black pixels for displaying colder objects, although the associated colors can be swapped.

Fusion night vision systems are used by soldiers and law enforcement personnel for locating and identifying targets. The output colors of a typical image intensification tube are shades of green. Because the output colors of the thermal and $I^2$ channels are similar, the white to black thermal image can mask/obscure the detail of the image intensification imagery when the output of a focal plane is fused with the output of an image intensification tube.

It has been discovered that target locating and identification can be improved with edge detection of the thermal image. Edges may be defined as pixel intensity discontinuities within an image. Edges help characterize an object boundary and are therefore useful for detection of objects in a scene. Furthermore, as edges outline objects of interest image details observable with the $I^2$ channel remain unobscured by the thermal image. Digital image processing can be used to implement an edge detection filter circuit used to detect the outline of objects. The filtered output, with the edges, may be fused with the image intensification information for display to an operator. Known edge detector circuits are disclosed in *Fundamentals of Digital Image Processing* authored by Anil K. Jain and published by Prentice-Hall, Inc., and are incorporated herein by reference in their entirety.

Figure 10:
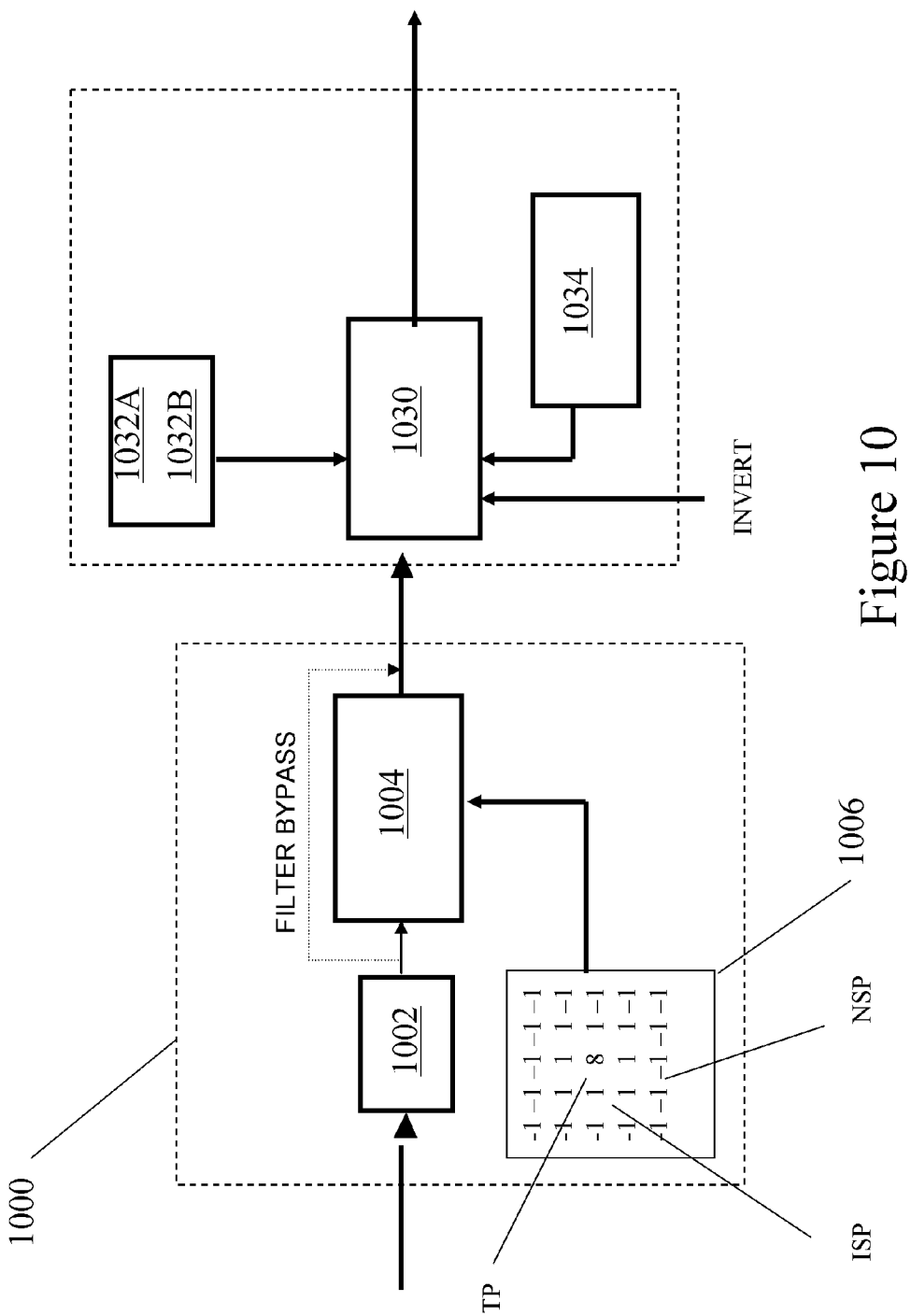
FIG. 10 is a block diagram of filter circuit and a threshold comparator and clamp circuit consistent with the invention.
Figure 11A:
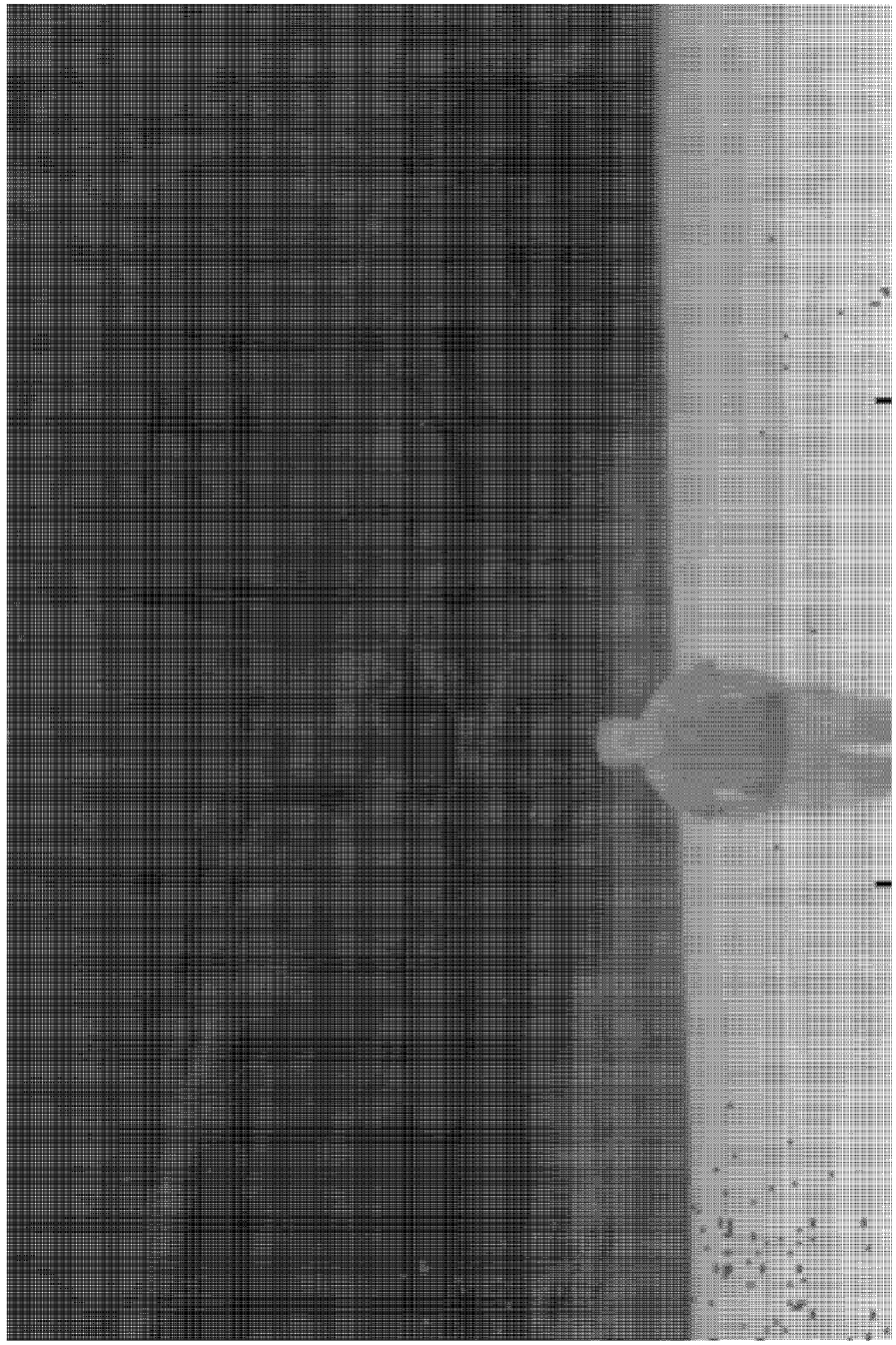
FIG. 11A is a photograph of an input into the filter circuit of FIG. 10.

As shown in FIG. 10, the edge detection filter circuit 1000 may include a multi-row, multi-column buffer 1002 and a multi-row, multi-column convolver 1004 and a multi-row, multi-column convolution kernel 1006. The filter may be incorporated into processing logic embedded in a programmable logic device, for example the model EP1S25F67217 from Altera, or other digital image processing devices. The multi-row, multi-column buffer 1002 may receive a corrected image from a non-uniformity correction circuit (not shown). The non-uniformity correction circuit calibrates the output signals of each of the pixels to compensate for focal plane array variability due to manufacturing tolerances. An example of a corrected image into the edge detection filter circuit 1000 is shown in FIG. 11A. Information received through the thermal channel may be represented by a plurality of pixels with associated received pixel values arranged in a plurality of rows and columns. In a 10 bit thermal imager for example, the received pixel values may range from zero (black) to ~1000 (white). The received pixel values may be inputted into and processed by the edge detection filter circuit 1000 before being displayed as display pixel values in the display for viewing by an operator. The output of the edge detection filter circuit 1000 may be fused with the output from the image intensification channel for viewing by the operator.

The multi-row, multi-column convolver kernel 1006, shown as a 5×5 convolution kernel, may have a target pixel TP surrounded by a plurality of immediately surrounding pixels ISP and the immediately surrounding pixels ISP may be surrounded by a plurality of next surrounding pixels NSP. The display pixel value for a target pixel may be obtained by using a demean filter which sums the product of the received target pixel value and a first multiplier (+8 in the example shown), the product of each of the received pixel values for the immediately surrounding pixel ISP and a second multiplier (+1 in the example shown), and the product of each of the received pixel values for the next surrounding pixels NSP and a third multiplier (−1 in the example shown). The sum of the first multiplier, the (8) second multipliers, and the (16) next surrounding pixels preferably equals zero although other non-zero sums may be used without departing from the invention. In this example, the first multiplier and the second multiplier are positive numbers and the third multiplier is a negative number, all preferably integers. Other multipliers may be used without departing from the invention. Although the convolver is shown as being 5×5, other sized convolver with extent larger or smaller may be used without departing from the invention, for example a 3×3 or 7×7 convolver may be used. Although the convolution is described as a demean filter, other gradient and edge enhancement filters with alternate convolution weighting, for example Gaussian, Laplacian, sharpening, or other high-pass filter weights may be used without departing from the invention. Although the filter circuit calculates the display value using all of the immediately surrounding pixel and the next surrounding pixel, some pixel values may be ignored without departing from the invention.

The edge detection filter circuit 1000 may also include a filter bypass circuit to allow the operator to manually override the filter function.

FIG. 11A shows an image of a person standing on an asphalt surface in front of a hillside as seen through a typical thermal imager. The asphalt surface and the hillside are large generally monochromatic areas with little or no detail.

Figure 11B:
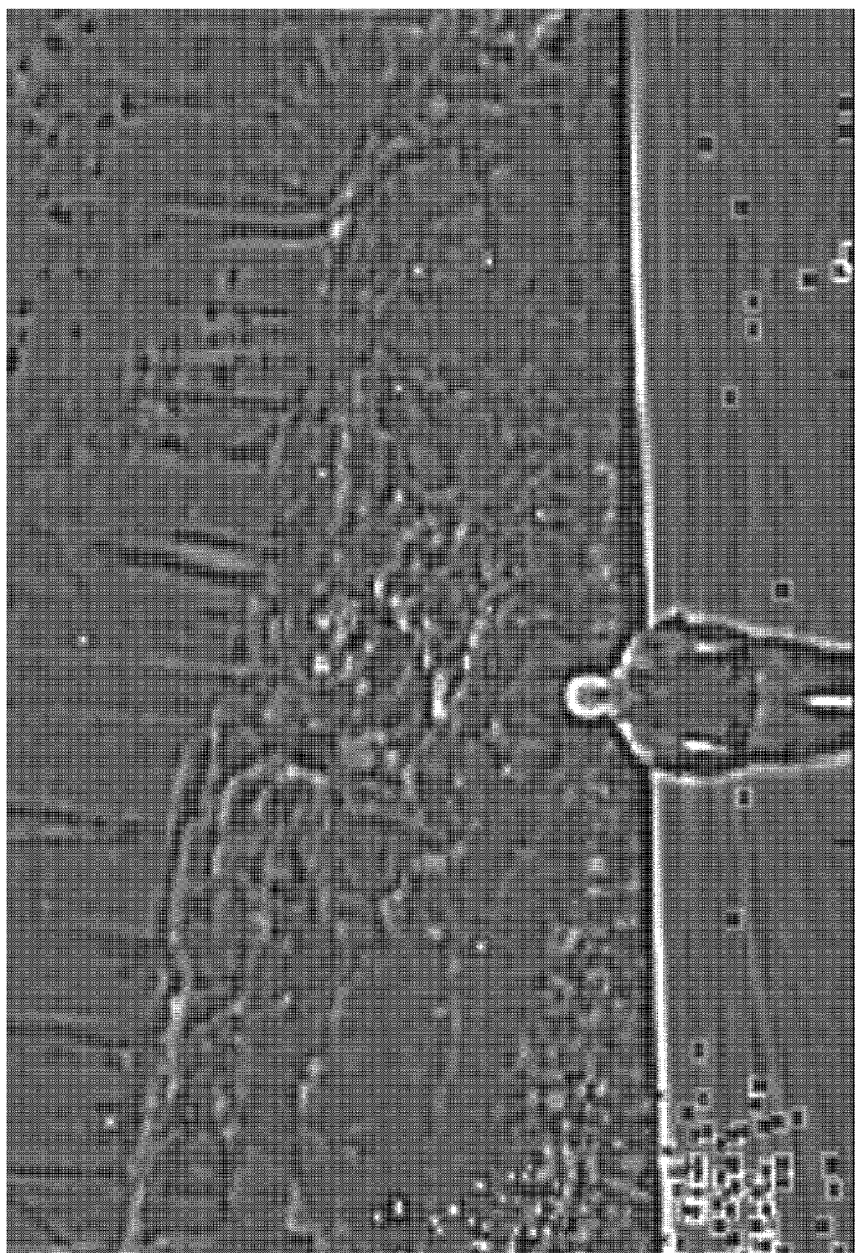
FIG. 11B is a photograph of an output from the filter circuit of FIG. 10.

FIG. 11B shows the same scene from FIG. 11A after the image is processed by the edge detection filter circuit 1000 of FIG. 9. The edge detection filter circuit 1000 more clearly shows the edge between the person and the background and between the asphalt and the hillside. When fused with the image intensification information, the view is less confusing and more detailed.

FIG. 12 is a flow chart for the systems of FIGS. 3, 4A, 4C, and 5. At block 1202 the system acquires information from a first channel about the scene. The first channel may be an $I^2$ channel having an $I^2$ tube for processing information in a first range of wavelengths. The first range of wavelengths may be approximately 400 nm to approximately 900 nm. Alternatively, other sensor technologies including near infrared electron bombarded active pixel sensors or short wave InGaAs arrays may be used without departing from the invention. The system also acquires information from a second channel and generates data representative of the scene at block 1204. The second channel may be a thermal channel having a focal plane array for processing information in a second range of wavelengths. The second range of wavelengths may be approximately 7,000 nm to approximately 14,000 nm. At block 1206 the system processes the generated data through a filter to define the edges. The system then combines the information from the first channel with the output of the filter for viewing by an operator at block 1208. The images may be fused electronically as shown in FIGS. 3 and 5 or optically as shown in FIGS. 4A and 4C.

Figure 13:
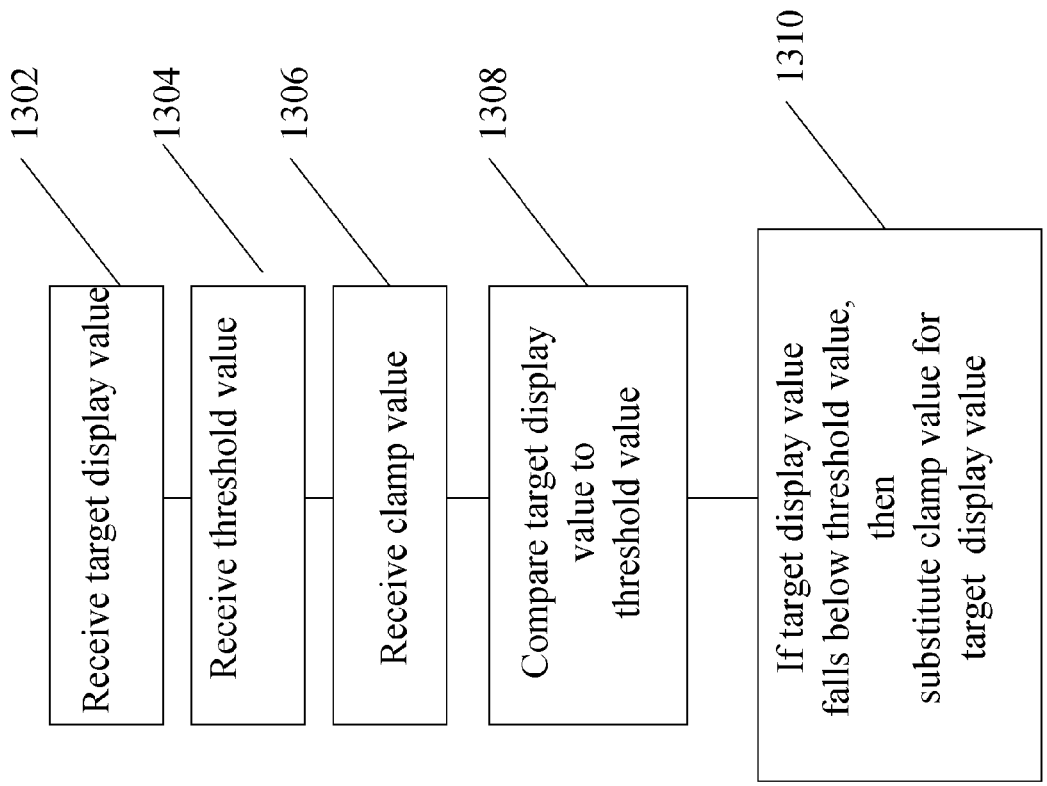
FIG. 13 is a second flowchart for use in the system of FIGS. 3, 4A, 4C and 5.
Figure 14:
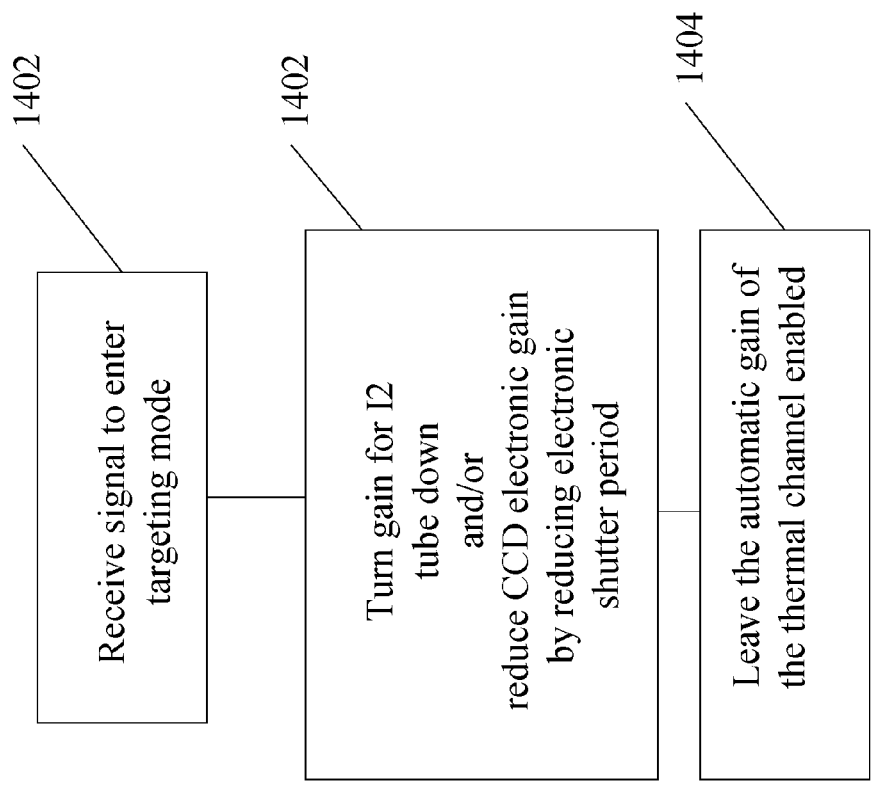
FIG. 14 is a third flowchart for use in the system of FIGS. 3, 4A, 4C and 5.

The output of the edge detection filter circuit 1000 may be inputted into a threshold comparator and clamp circuit 1030 (see FIG. 10) to help improve viewability. As shown in FIG. 13, the threshold comparator and clamp circuit 1030 may receive a calculated display value for a target pixel at block 1302, a threshold value 1034 at block 1304, and one or more clamp values 1032A, 1032B at block 1306. The clamp value 1032A may be the pixel value the target pixel is changed to if the target pixel value falls below the threshold value 1034 and the second clamp value 1032B may be the pixel value the target pixel is changed to if the target pixel value exceeds the threshold. The threshold comparator and clamp circuit 1030 compares the calculated display value for a target pixel to a threshold value at block 1308. If the calculated display value falls below the threshold value, the threshold comparator and clamp circuit 1030 may substitute the clamp value 1032A for the calculated display value for the target pixel, for example zero, and if the calculated display value equal or exceeds the threshold value, the threshold comparator and clamp circuit 1030 substitutes an alternate clamp value 1032B (e.g. white, 1024) for the target pixel or leaves the calculated value as is.

Typical thermal imagers have the ability to either display the hottest objects as either white (lowest display value) or black (highest display value). When the imager is set to display the hottest objects as white ("white hot"), the clamp value may be chosen to be zero. Alternatively, the clamp value may be chosen as the maximum value if the hottest objects are displayed as black. Depending on the filter used, low values other than zero and high values other than the maximum may be used with out departing from the invention.

In an alternative embodiment, if the calculated display value exceeds the threshold value, the threshold comparator and clamp circuit 1030 may substitute the clamp value for the calculated display value for the target pixel, for example white 1024, and if the calculated display value does not equal or exceeds the threshold value, the threshold comparator and clamp circuit 1030 substitutes an alternate clamp value (e.g. black, 0) for the target pixel or leaves the calculated value as is.

The threshold value 1034 may be a predetermined value below which the target pixel value is changed to the clamp value 1032 before it is displayed. The output of the demean filter edge detection circuit will have data values both positive and negative with a mean value of near zero. Therefore, an appropriate threshold value for the preferred embodiment is near zero. Other threshold values may preferably be chosen based on the edge filter chosen. In one embodiment, the threshold value 1034 is chosen as the mid point between the minimum value (zero) and the maximum value (1024 for 10-bit image data), for example 512. Other threshold values may be chosen without departing from the invention.

Figure 11C:
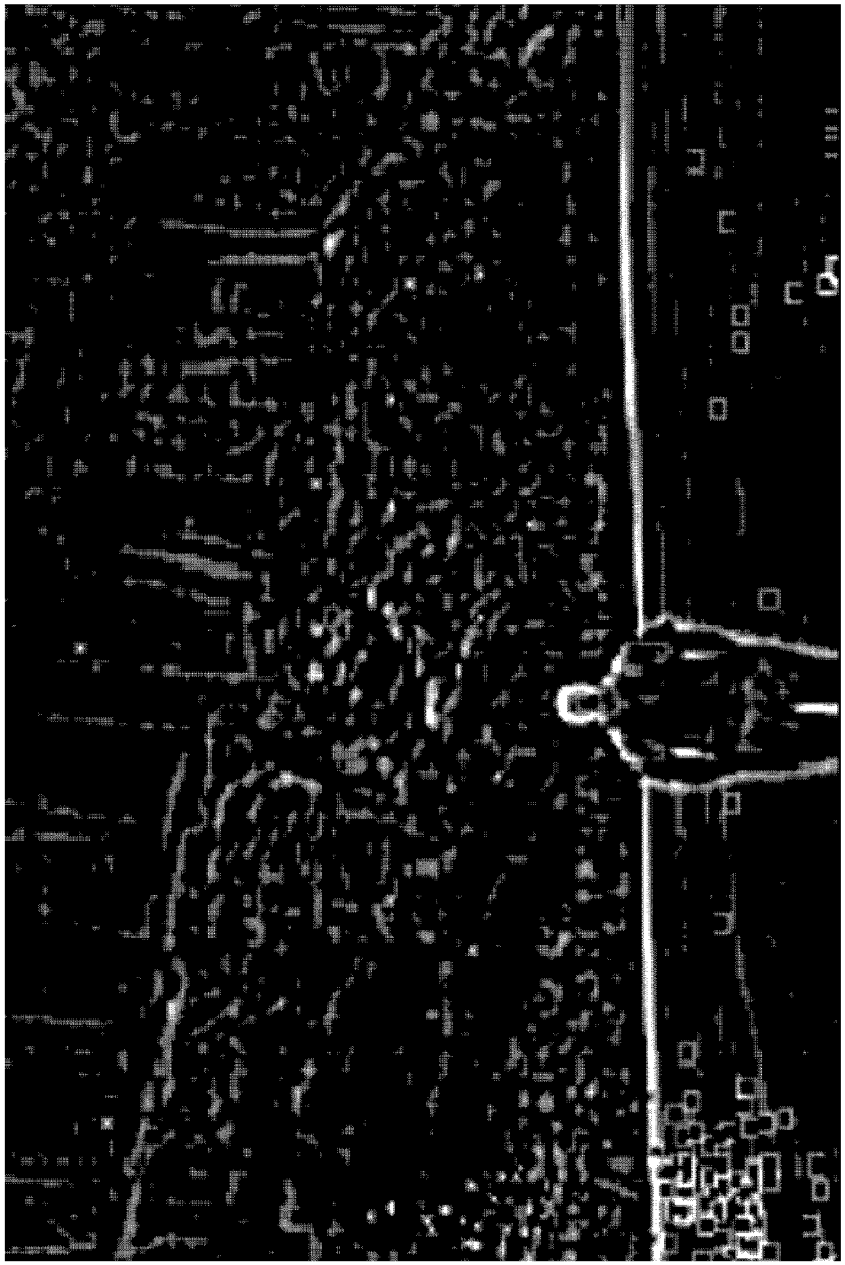
FIG. 11C is a photograph of an output of the threshold comparator and clamp circuit of FIG. 10.

FIG. 11C shows the same scene from FIG. 11A after the image is processed by the threshold comparator and clamp circuit of FIG. 10. As can be seen, dark regions of FIG. 11B are driven to value zero or black.

Certain embodiments of the invention can be implemented in hardware, software, firmware, or a combination thereof. In one embodiment, the filter circuit and/or the threshold comparator and clamp circuit are/is implemented in software or firmware that is stored in a memory and that is executable by a suitable instruction execution system. If implemented in hardware, as in an alternative embodiment, the circuits can be implemented with any or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Fusion night vision systems may be used at night with a weapon having an infrared laser illuminator aligned with the bore of the weapon. The fusion night vision systems allow the operator to aim and fire the weapon without having to look through a scope. The operator may locate the target using the thermal channel information and align the weapon with the $I^2$ channel information. When attempting to acquire a target using a fusion night vision system having automatic gain control of the thermal and the $I^2$ channels, the $I^2$ information from the laser illuminator may saturate the image local to the target making locating the target more difficult. To overcome this problem, the operator may switch the fusion night vision system into a "targeting mode" when trying to acquire a target. After the system receives an enter targeting mode signal at block 1402, the system may turn down the gain from the $I^2$ tube using a digitally controlled potentiometer and/or reduce CCD electronic gain by reducing electronic shutter period, and leave the automatic gain of the thermal channel enabled at block 1404. Targeting mode may be accessed through a dedicated actuator or through a menu.

Figure 15:
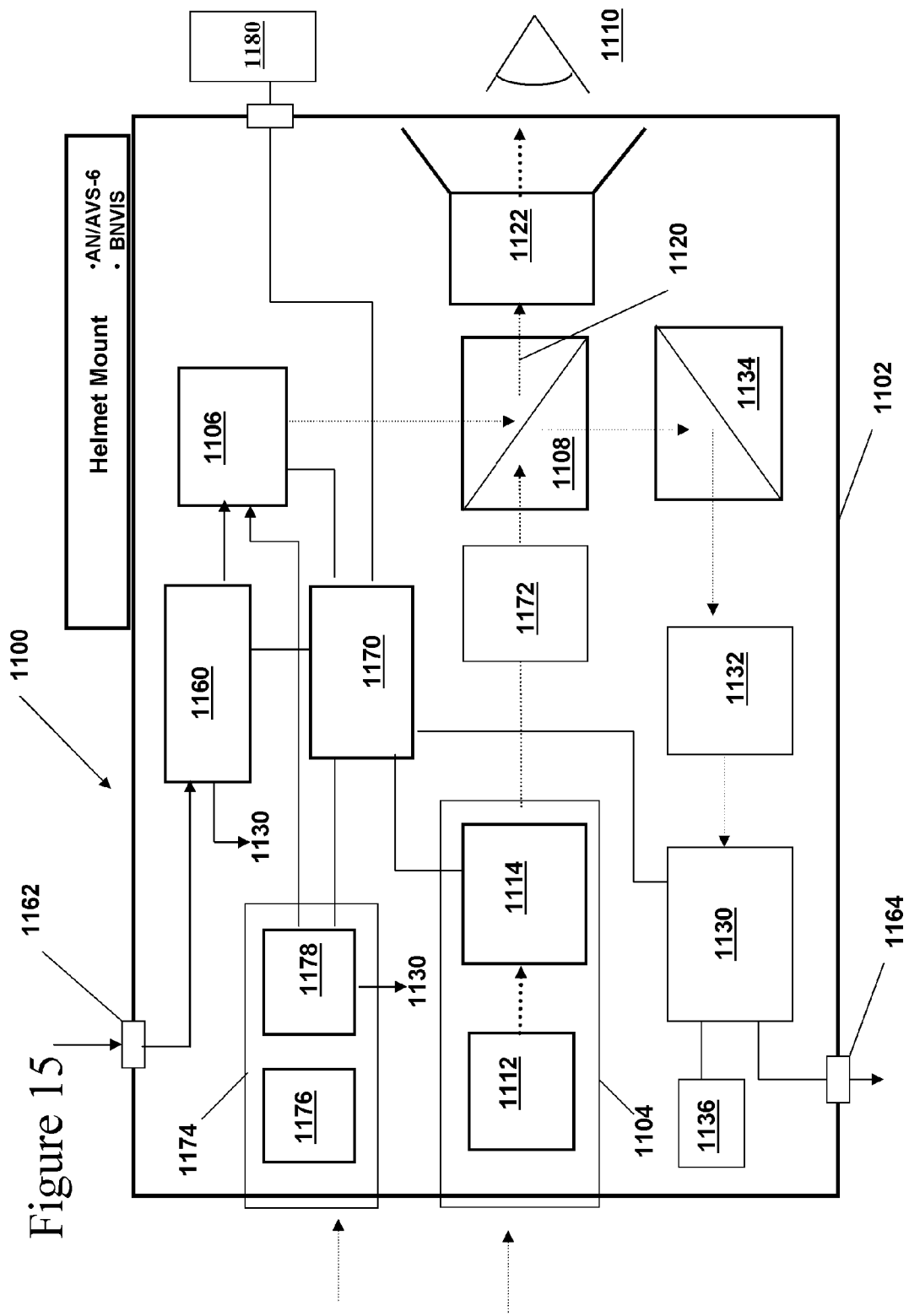
FIG. 15 is a block diagram of a fifth night vision system consistent with the invention.

FIG. 15 is a block diagram of a fifth night vision system 1100 consistent with the invention. The electronics and optics may be housed in a housing 1102. The housing 1102 may include mounting hardware for coupling to a helmet or other headgear or a weapon. Information from an image intensification ($I^2$) channel 1104 and data from a display 1106 may be captured on an image combiner 1108 for viewing by an operator 1110. The display 1106 may receive system information, for example battery life, vehicle information, for example flight instrumentation, and positioning information, for example location, heading, and elevation as received from a global positioning system, from signal processing electronics 1160. The display 1106 may also display scene information from a variety of sensor/detector technologies including, a focal plane array, a digital image intensification tube, a near infrared electron bombarded active pixel sensor, a short wave InGaAs array, a charged couple device, and a CMOS detector. The display 1106 may be a miniature flat panel display, more particularly; it may be a monochrome organic light emitting diode (OLED) microdisplay or a liquid crystal display (LCD). The operator 1110 may see the fused image 1120 through an eyepiece 1122 that may have one or more ocular lenses for magnifying and focusing the fused image 1120.

A camera 1130 with appropriate lenses 1132 may be disposed within the housing 1102 and optically aligned with the image combiner 1108 for viewing system and/or scene information from the display 1106 and scene information from the $I^2$ channel 1104. A camera may be any apparatus for capturing or recording scene imagery or system information. The scene information and/or system information may be recorded in permanent form in storage 1136 within the night vision system 1100 or exported to a remote location by wire or through the air through a data-out port 1164. Depending on the system configuration, a prism or other light reflecting device 1134 may be aligned in the optical path between the camera 1130 and the image combiner 1108.

The $I^2$ channel 1104 may be configured to process information in a first range of wavelengths (the visible and NIR portion of the electromagnetic spectrum from approximately 400 nm to approximately 900 nm). The low end and the high end of the range of wavelengths may vary without departing from the invention. The $I^2$ channel 1104 may have an objective focus 1112 and an $I^2$ tube 1114. Suitable $I^2$ tubes 1114 may be Generation III tubes and are available (from Northrop Grumman and ITT). After the scene information passes through the $I^2$ tube 1114, it may pass through field lens assembly 1172 before entering the image combiner 1108. A coating on the image combiner 1108 may control the mix of information directed through and/or reflected off of the image combiner 1108.

The night vision system 1100 may have a plurality of user accessible actuators for turning the system and camera on and off. The actuators may employ a silicone overlay over tactile dome switches. The overlay may be coupled to the housing 1102 to seal out moisture and particulates and the dome switches may be coupled to a processor.

The night vision system 1100 may also have a data-in port 1162 for receiving data, for example flight instrumentation information, to be displayed on the display 1106. The electronics may be powered by an internal power supply 1170. Alternatively, the night vision system 1100 may receive power from a removable battery pack 1180.

Two or more image intensification tubes may be housed in the housing 1102 without departing from the invention. The $I^2$ channel 1104 may also be fused with an infrared channel 1174 in the housing 1102 without departing from the invention. The infrared channel 1174 may have an objective focus 1176 and a focal plane array and imaging electronics 1178. The focal plane array and imaging electronics 1178 may be coupled to the display 1106 for viewing by the operator 1110. The focal plane array and imaging electronics 1178 may be a micro bolometer imager currently available from DRS. Other detectors capable of processing scene information, including a focal plane array, a digital image intensification tube, a near infrared electron bombarded active pixel sensor, a short wave InGaAs array, a charged couple device, and a CMOS detector, may be used without departing from the invention. Alternatively, scene information from the focal plane array and imaging electronics 1178 and/or system information may be electrically directed into the camera 1130.

FIG. 16 is a ray diagram for the night vision system of FIG. 15. As shown field lens assembly 1172 may be disposed in the optical path between the image combiner 1108 and the $I^2$ tube 1114. The scene information travels through the objective focus 1112, the $I^2$ tube 1114, the field lens assembly 1172, and image combiner 1108, to the eyepiece 1122 without significantly compromising the high-resolution imagery from the $I^2$ tube 1114. The image combiner 1108 may be configured to combine the scene information from the image intensification tube 1114 and scene and/or system information from the display 1106, for viewing by the operator 1110. The camera 1130 may be at least partially disposed within the housing 1102 for capturing scene information reflected off of and/or passing through the image combiner 1108. The design of the eyepiece 1122 may compensate for the observations and focus shift introduced by the image combiner 1108.

This embodiment incorporates both the display 1106 and the camera 1130 into the night vision system 1100 without encroaching the eye relief ER. The eye relief is the distance along the optical axis from the vertex of the first optical element (the eyepiece 1122 in FIG. 16) to the vertex of the eye of the operator. For many military applications, the desirable eye relief is about 30 mm, although other distances are considered within the scope of the invention. A 30 mm eye relief allows the operator to wear eyeglasses or a protective mask without interfering with the night vision system.

Although several embodiments of the invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is:

1. A fusion night vision system, comprising:
a housing;
a first channel at least partially disposed within the housing for processing information in a first range of wavelengths;
a second channel at least partially disposed within the housing for processing information in a second range of wavelengths;
an edge detection filter circuit coupled to the second channel;
a display for projecting an output from the edge detection filter circuit; and
an optical image combiner aligned with the display for combining information from the first channel with the output of the edge detection filter circuit, further comprising a threshold comparator and clamp circuit coupled to the edge detection filter circuit, the threshold comparator and clamp circuit setting a display value for a target pixel to a predetermined value if a calculated value exceeds a threshold value.

2. A fusion night vision system, comprising:

a housing;

an image intensifier tube at least partially disposed within the housing for imaging scene information in a first range of wavelengths;

a first sensor at least partially disposed within the housing for imaging scene information in a second range of wavelengths;

an edge detection filter circuit coupled to the first sensor, the filter circuit configured to locate pixel intensity discontinuities in an output from the first sensor; and a threshold comparator clamp circuit coupled to the edge detection filter circuit for improving viewability, the threshold comparator and clamp circuit configured to receive a calculated display value for a target pixel, a threshold value, a first clamp value, and a second clamp value, wherein the first clamp value is the pixel value the target pixel is changed to if the target pixel value falls below the threshold value and the second clamp value is the pixel value the target pixel is changed to if the target pixel value exceeds the threshold value; and an optical image combiner for combining scene information from the image intensifier tube with an output of the threshold comparator clamp circuit.

3. The fusion night vision system of claim 2, wherein the image intensification tube is optically aligned with the optical image combiner and an eyepiece to enable direct viewing of a scene by an operator and the first sensor is a focal plane array.

4. The fusion night vision system of claim 2, further comprising a display aligned to the optical image combiner, the display having a plurality of pixels arranged in rows and columns for projecting scene information from the first sensor to an operator.

5. The fusion night vision system of claim 4, wherein the edge detection filter circuit calculates the value for the target pixel based on received values of surrounding pixels and the calculated value is displayed in the display for viewing by the operator.

6. The fusion night vision system of claim 5, wherein the calculated value is the sum of a product of the first multiplier and the target pixel value, the product of a second multiplier and the immediately surrounding received pixel values, and the product of a third multiplier and the next surrounding received pixel values.

7. The fusion night vision system of claim 5, wherein the edge detection filter circuit multiples a received target pixel value by a first multiplier, multiples a plurality of immediately surrounding received pixel value by a second multiplier, and multiples a plurality of next surrounding received pixel value by a third multiplier to obtain the calculated display value.

8. The fusion night vision system of claim 2, wherein the first range of wavelengths is approximately 400 nm to approximately 900 nm and the second range of wavelengths is approximately 7,000 nm to approximately 14,000 nm.

9. The fusion night vision system of claim 2, wherein the edge detection filter circuit comprises a multi-row, multi-column buffer and a multi-row, multi-column convolution kernel.

10. The fusion night vision system of claim 2, the threshold comparator and clamp circuit setting a display value for the target pixel to a predetermined value if the calculated value exceeds a threshold value.

11. The fusion night vision system of claim 2, wherein the optical image combiner is a beam splitter and is aligned between an exit of the image intensifier tube and an eyepiece to enable an operator to view a fused image.

12. The fusion night vision system of claim 2, further comprising an eyepiece, the eyepiece optically aligned with the optical image combiner and the image intensifier tube to enable direct viewing of the scene information through the image intensifier tube.

* * * * *